(12) United States Patent
Booth et al.

(10) Patent No.: US 11,014,421 B2
(45) Date of Patent: May 25, 2021

(54) RECREATIONAL OFF-HIGHWAY VEHICLE

(71) Applicant: YAMAHA HATSUDOKI KABUSHIKI KAISHA, Shizuoka (JP)

(72) Inventors: Todd A. Booth, Newnan, GA (US); Keith E. Kotrla, Magnolia, TX (US); Louis R. Doucette, Acworth, GA (US); Craig S. Letourneau, Senoia, GA (US); Thomas Teribury, Senoia, GA (US)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 84 days.

(21) Appl. No.: 16/529,422

(22) Filed: Aug. 1, 2019

(65) Prior Publication Data
US 2021/0031580 A1 Feb. 4, 2021

(51) Int. Cl.
*B60G 3/26* (2006.01)
*B60K 17/16* (2006.01)
(Continued)

(52) U.S. Cl.
CPC ............... *B60G 3/202* (2013.01); *B60G 3/26* (2013.01); *B60G 7/00* (2013.01); *B60K 17/165* (2013.01); *B60G 7/001* (2013.01); *B60G 2200/144* (2013.01); *B60G 2200/1442* (2013.01); *B60G 2200/182* (2013.01); *B60G 2200/46* (2013.01); *B60G 2200/462* (2013.01); *B60G 2204/128* (2013.01); *B60G 2300/07* (2013.01);
(Continued)

(58) Field of Classification Search
CPC . B60G 3/202; B60G 3/26; B60G 3/20; B60G 3/18; B60G 2200/144; B60G 2200/182; B60G 2200/462; B60G 2200/18; B60G 2200/1442; B60G 2200/46; B60G 2300/124; B60G 2300/13; B60G 2300/07; B60G 7/001; B60G 7/00; B60G 2204/128; B62D 23/005; B60K 17/165; B60K 17/16; B60Y 2200/124; B60Y 2200/20
USPC ...... 180/359; 280/124.128, 5.52, 5.521, 5.22
See application file for complete search history.

(56) References Cited

U.S. PATENT DOCUMENTS

| 7,934,579 B2 | 5/2011 | Bowers |
| 9,248,877 B1 | 2/2016 | Sawai |

(Continued)

FOREIGN PATENT DOCUMENTS

JP 03082614 A * 4/1991

*Primary Examiner* — Keith J Frisby
(74) *Attorney, Agent, or Firm* — Global IP Counselors, LLP

(57) ABSTRACT

A recreational off-highway vehicle includes a vehicle frame, least one front wheel, a pair of rear wheels, a pair of rear suspensions, a rear differential and a motor. The rear suspensions connect the rear wheels to the vehicle frame. The rear differential connects to the rear wheels. The motor is connected to the rear differential to drive the rear wheels. Each rear suspensions includes a trailing arm, a floating rear knuckle, a shock absorber and a plurality of control links. The trailing arm has a front end pivotally connected to the vehicle frame. The floating rear knuckle is pivotally connected to a rear end of the trailing arm. The shock absorber is coupled between the vehicle frame and the trailing arm. The control links have first ends movably supporting the floating rear knuckle and second ends pivotally connected to the vehicle frame forward of the rear differential.

20 Claims, 22 Drawing Sheets

(51) Int. Cl.
*B60G 7/00* (2006.01)
*B60G 3/20* (2006.01)
*B62D 23/00* (2006.01)

(52) U.S. Cl.
CPC .... *B60G 2300/124* (2013.01); *B60G 2300/13* (2013.01); *B62D 23/005* (2013.01)

(56) References Cited

U.S. PATENT DOCUMENTS

| | | |
|---|---|---|
| 9,370,999 B2 * | 6/2016 | Osaki .................. F16H 59/00 |
| 9,440,671 B2 | 9/2016 | Schlangen et al. |
| 2013/0277937 A1 | 10/2013 | Keller et al. |
| 2015/0224874 A1 | 8/2015 | Osaki |
| 2016/0347137 A1 | 12/2016 | Despres-Nadeau et al. |
| 2017/0080977 A1 | 3/2017 | Schroeder et al. |

* cited by examiner

RECREATIONAL OFF-HIGHWAY VEHICLE

BACKGROUND

Technical Field

The present invention generally relates to the field of recreational off-highway vehicles. More specifically, the present invention relates to a recreational off-highway vehicle having a rear suspension assembly with independent suspensions.

Background Information

Generally, recreational off-highway vehicles are designed to be operated over rough terrain. Basically, a recreational off-highway vehicle is considered to be any small vehicle that is not street legal. In other words, a recreational off-highway vehicle is not equipped and licensed for use on public roads, while a street legal vehicle is equipped and licensed for use on public roads. These recreational off-highway vehicles are often driven on uneven terrain such as rough roads, steep inclines and declines. As a consequence of these considerations, the design of a recreational off-highway vehicle can be quite different from vehicles designed for driving on paved roads.

Various types of recreational off-highway vehicles that are designed to be primarily driven on unpaved surfaces and typically have one or more seats. One example of a recreational off-highway vehicles is a side-by-side off-road vehicle in which the driver and a passenger are seated side-by-side. Some side-by-side recreational off-road vehicles also have a second row of seats to accommodate one or more additional passengers. These recreational off-highway vehicles typically have a frame with an open cockpit, a roll cage, a steering wheel and four wheels. In the case of these side-by-side recreational off-highway vehicles, a drive source such as an internal combustion engine is utilized to drive one or more of the wheels. Typically, the drive source will be configured to drive two of the wheels or all four of the wheels. Typically, the engine is provided with a transmission that transfers power to an output shaft from a crankshaft of the engine. The output shaft drives the wheels through a drivetrain.

Since the recreational off-highway vehicles are often driven on rough terrains, the suspension assemblies are needed that have a large amount of travel to handle the rough terrain. However, as the wheels move up and down in a vertical direction by the suspension assemblies, the wheel orientations also tend to change. For example, the camber and the toe of the wheels may change as the wheels move up and down in the vertical direction. Camber is the extent that the wheel tracks away from perpendicular ground contact through the full suspension stroke, while toe is that the wheel tracks in and/or out away from a vehicle centerline through the full suspension stroke. If the change in camber and/or toe of the wheels are too large, then handling of the recreational off-highway vehicle may be adversely affected. Scrub is the extent that the wheel slips along the ground plane perpendicular to the direction of vehicle travel through full suspension stroke.

SUMMARY

Generally, the present disclosure is directed to various features of a rear suspension assembly of a recreational off-highway vehicle. In driving various recreational off-highway vehicles, it has been found that maintaining a zero toe change and a zero camber change through the full suspension stroke is preferable while also minimizing scrub, which is the extent that the wheels slip along the ground plane perpendicular to the direction of vehicle travel through the full suspension stroke.

Accordingly, one object of the present disclosure is directed to improving a rear suspension assembly of a recreational off-highway vehicle to minimizing toe change and camber change through the full suspension stroke. Preferably, the rear suspension assembly has a zero toe change and a zero camber change through the full suspension stroke while also minimizing scrub.

In accordance with one aspect of the present disclosure, a recreational off-highway vehicle is provided that basically comprises a vehicle frame, at least one front wheel, a right rear wheel, a left rear wheel, a right rear suspension, a left rear suspension, a rear differential and a motor. The vehicle frame has a front portion, a rear portion and a passenger compartment between the front and rear portions. The front wheels support the front portion of the vehicle frame. The right rear wheel supports a right lateral side of the rear portion of the vehicle frame. The left rear wheel supports a left lateral side of the rear portion of the vehicle frame. The right rear suspension operatively connects the right rear wheel to the vehicle frame. The left rear suspension operatively connects the left rear wheel to the vehicle frame. The rear differential operatively connects to the left rear wheel and the right rear wheel. The motor is operatively connected to the rear differential to drive the right and left rear wheels via the rear differential. Each of the right and left rear suspensions comprises a trailing arm, a floating rear knuckle, at least one shock absorber and a plurality of control links. The trailing arm has a front end pivotally connected to the vehicle frame. The floating rear knuckle is pivotally connected to a rear end of the trailing arm. The at least one shock absorber is coupled between the vehicle frame and the trailing arm. The control links have first ends movably supporting the floating rear knuckle and second ends pivotally connected to the vehicle frame forward of the rear differential.

Also, other features, aspects and advantages of the disclosed recreational off-highway vehicle will become apparent to those skilled in the field of manufacturing recreational off-highway vehicles from the following detailed description, which, taken in conjunction with the annexed drawings, discloses several illustrative embodiments of a recreational off-highway vehicle with various features.

BRIEF DESCRIPTION OF THE DRAWINGS

Referring now to the attached drawings which form a part of this original disclosure.

Figure 1:
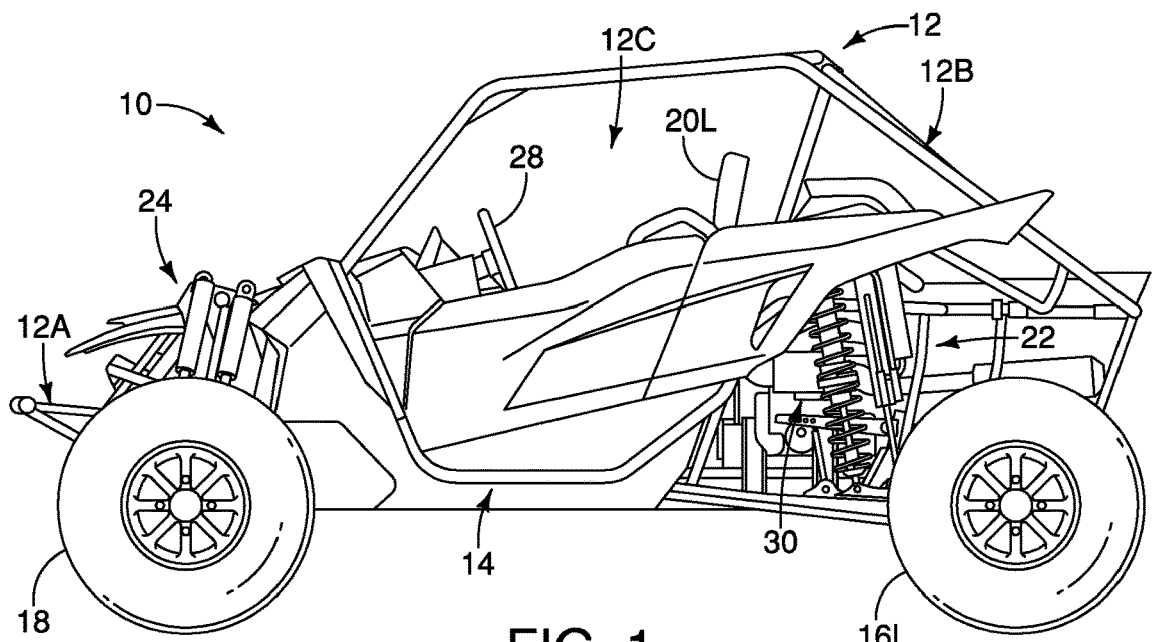
FIG. 1 is a left side elevational view of a recreational off-highway vehicle having a rear suspension assembly with a pair of rear suspensions in accordance with one illustrative embodiment.

It should be noted that these figures are intended to illustrate the general characteristics of methods, structure and/or materials utilized in certain illustrative embodiment and to supplement the written description provided below. These figures are to reduce scale of the actual recreational off-highway vehicle but may not precisely reflect the precise structural or performance characteristics of any given embodiment. However, the dimensional relationships and the arrangement of the parts of the recreational off-highway vehicle are accurately depicted.

DETAILED DESCRIPTION OF EMBODIMENTS

Selected embodiments will now be explained with reference to the drawings. It will be apparent to those skilled in the recreational off-highway vehicle field from this disclosure that the following descriptions of the embodiments are provided for illustration only and not for the purpose of limiting the invention as defined by the appended claims and their equivalents. Like reference numerals in the drawings denote like similar or identical elements or features, and thus the descriptions of the similar or identical elements or features may be omitted in later embodiments.

Figure 2:
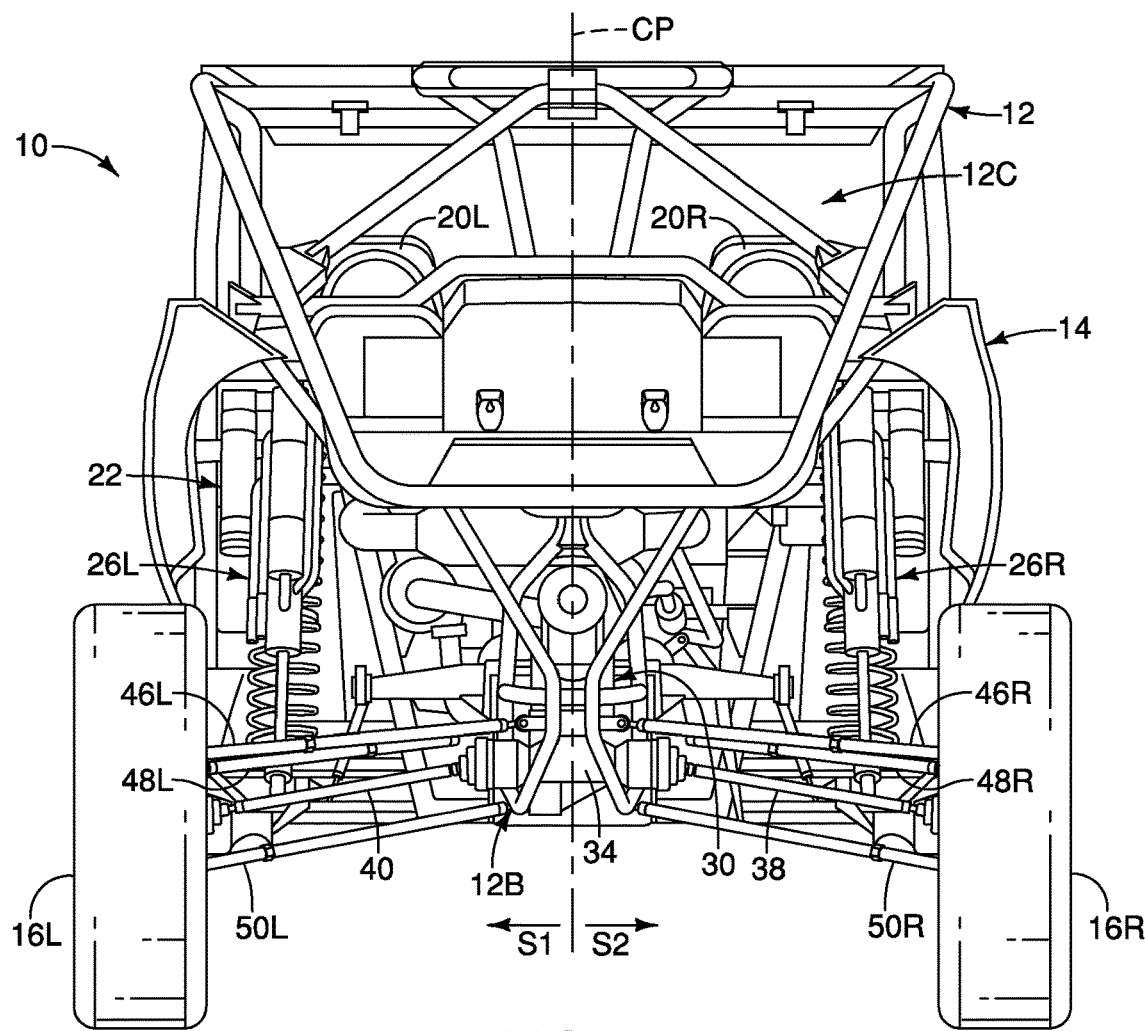
FIG. 2 is a rear end elevational view of the recreational off-highway vehicle illustrated in FIG. 1 in which the rear suspension assembly is in a resting position (1 g of force— the force of gravity at the Earth's surface, which is 9.8 m/s$^2$)
Figure 3:
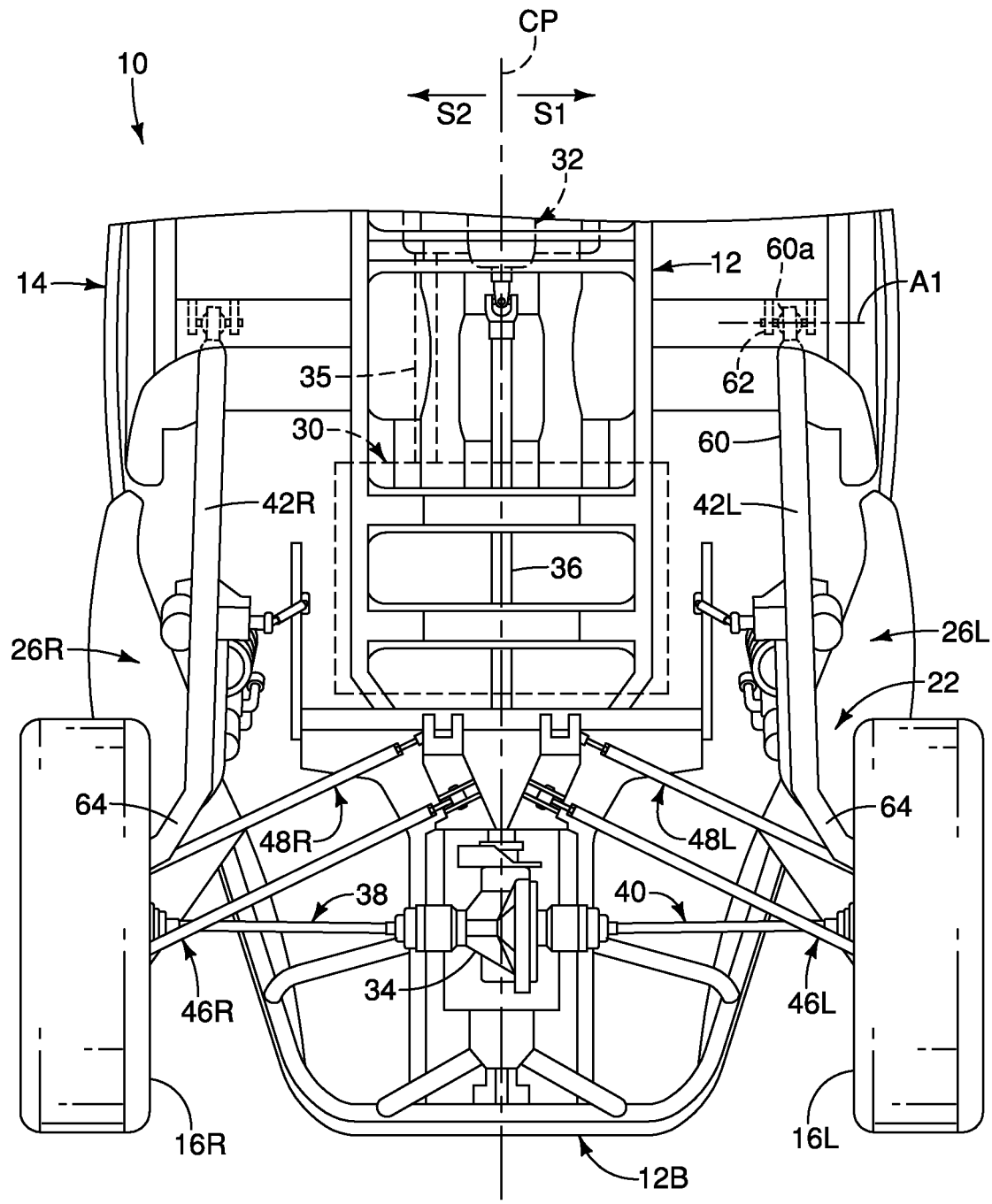
FIG. 3 is a partial bottom plan view of the recreational off-highway vehicle illustrated in FIGS. 1 and 2 corresponding to the resting position (1 g of force) with various parts removed for purposes of illustration.

Referring initially to FIGS. 1 to 3, a recreational off-highway vehicle 10 is illustrated in accordance with one illustrative embodiment. Here, the recreational off-highway vehicle 10 is a side-by-side recreational off-highway vehicle for two people. Generally, as used herein, the term "recreational off-highway vehicle" refers to a vehicle primarily designed for driving on unpaved and uneven surfaces. Of course, recreational off-highway vehicles such as the recreational off-highway vehicle 10 illustrated herein can be also driven on paved surfaces. However, the term "recreational off-highway vehicle" does not include large vehicles that are designed for driving primarily on paved surfaces. Hereinafter, for the sake of brevity, the recreational off-highway vehicle 10 will be referred to simply as the vehicle 10.

Hereinafter, for the sake of brevity, the recreational off-highway vehicle 10 will be referred to simply as the vehicle 10. The vehicle 10 basically comprises a vehicle frame 12, a vehicle body 14, a pair of rear wheels 16R and 16L, a pair of front wheels 18 (only the left wheel is shown), a driver seat 20L and a passenger seat 20R. The vehicle body 14, the driver seat 20L and the passenger seat 20R are attached to the vehicle frame 12 in a conventional manner. As seen in FIG. 1, the rear wheels 16R and 16L are connected to the vehicle frame 12 by a rear suspension assembly 22, while the front wheels 18 are connected to the vehicle frame 12 by a front suspension assembly 24. In some applications of the vehicle 10, the vehicle body 14 can be omitted. Also, in some applications of the vehicle 10, only a single front wheel can be provided instead of two front wheels which are used in the illustrated embodiment.

The vehicle frame 12 is typically made from a plurality of hollow tubes and a plurality of brackets that are welded to each other. It is contemplated that at least some of the hollow tubes could be replaced by other types of supports such as solid support members and/or beams. While the hollow tubes have a cylindrical cross-section, it is contemplated that cross-sections other than circular. Preferably, the hollow tubes, the beams and the brackets are preferably made of a suitable rigid metallic material such as steel, aluminum, titanium, etc. It is also contemplated that at least some of the hollow tubes, the beams, and the brackets could be made of a non-metallic material, such as reinforced composite materials such as fiber reinforced plastics. It is also contemplated that at least some of the members and brackets could be joined to each other by means other than welding, such as by fastening and bonding for example. It is also contemplated that two or more of the hollow tubes, the beams, and the brackets described below could be cast or otherwise formed as a single component. It is also contemplated that the vehicle frame 12 could have more or less the hollow tubes, the beams, and the brackets than illustrated below depending on the type of materials used, the required strength and rigidity of the vehicle frame 12 and the weight of the components attached to the vehicle frame 12 for example.

As seen in FIG. 1, the vehicle body 14 is supported by the vehicle frame 12 in a conventional manner. The vehicle frame 12 has a front portion 12A, a rear portion 12B and a passenger compartment 12C between the front and rear portions 12A and 12B. The left rear wheel 16L supports a left lateral side S1 of the rear portion 12B of the vehicle frame 12. The right rear wheel 16R supports a right lateral side S2 of the rear portion 12B of the vehicle frame 12. The front wheels 18 support the front portion 12A of the vehicle frame 12. The vertical center plane CP is equally spaced from the left and right rear wheels 16L and 16R.

In the illustrated embodiment, as seen in FIG. 2, the driver seat 20L is disposed in the passenger compartment 12C on the first lateral side S1 (the left side) of the vehicle 10, while the passenger seat 20R in the passenger compartment 12C is disposed on the second lateral side S2 (the right side) of the vehicle 10. However, it is contemplated that the driver seat 20L could be disposed on the right side of the vehicle 10 and that the passenger seat 20R could be disposed on the left side of the vehicle 10.

The vehicle body 14 includes a plurality of body panels that are connected the vehicle frame 12. The body panels of the vehicle body 14 aid in protecting various components of the vehicle 10 and provide some of the aesthetic features of the vehicle 10. As mentioned above, in some applications of the vehicle 10, the vehicle body 14 can be omitted. Since the body panels of the vehicle body 14 does not directly affect the rear suspension assembly 22, the body panels of the vehicle body 14 will not be discussed and/or illustrated in detail herein.

As seen in FIG. 1, the front wheels 18 support the front portion 12A of the vehicle frame 12 via the front suspension assembly 24. The front suspension assembly 24 can be any type of suspension as needed and/or desired. Here, the front suspension assembly 24 includes a pair of double A-arm suspensions that each includes a lower A-arm, an upper A-arm and a pair of shock absorbers. The front suspensions are swingably (up and down) relative to the vehicle frame 12, and independently suspend the associated one of the front wheels 18. The front suspensions are basically a mirror images of each other. Since double A-arm suspension assemblies of this type are well known, the front suspension assembly 24 will not be described in greater detail for the sake of brevity.

As seen in FIGS. 2 and 3, the right and left rear wheels 16R and 16L support the rear portion 12B of the vehicle frame 12 via the rear suspension assembly 22. In the illustrated embodiment, the rear suspension assembly 22 includes a right rear suspension 26R and a left rear suspension 26L. Each of the right and left rear suspensions 26R and 26L is swingably (up and down) relative to the vehicle frame 12, and independently suspends the associated one of the right and left rear wheels 16R and 16L. Thus, the illustrated vehicle 10 preferably includes four independent suspensions.

The right rear wheel 16R supports a night rear lateral side of the rear portion 12B of the vehicle frame 12 via the right rear suspension 26R. In particular, the right rear suspension 26R operatively connects the right rear wheel 16R to the vehicle frame 12 for relative upward and downward movements in a vertical direction. The left rear wheel 16L supports a left rear lateral side of the rear portion 12B of the vehicle frame 12 via the left rear suspension 26L. In particular, the left rear suspension 26L operatively connects the left rear wheel 16L to the vehicle frame 12 for relative upward and downward movements in the vertical direction. In other words, the right and left rear wheels 16R and 16L are coupled to the vehicle frame 12 via the rear suspensions 26R and 26L, respectively. Here, the right and left rear suspensions 26R and 26L are independently movably with respect to the vehicle frame 12 for relative upward and downward movements in the vertical direction.

As seen in FIG. 1, the vehicle 10 further comprises a steering wheel 28 is that is disposed in front of the driver seat 20L. The steering wheel 28 is operatively connected to the front wheels 18 by a steering column in a conventional manner for turning the front wheels 18 in response to turning of the steering wheel 28. In some applications, a control stick can be used in place of the steering wheel 28. Other suitable steering devices also can be used, such as, without limitation, a handlebar, one or more push-buttons, one or more foot pedals and/or the like. Thus, here, the front wheels 18 are steerable wheels for changing the travel path of the vehicle 10.

Preferably, the vehicle 10 is a four-wheel drive vehicle in which both the front wheels 18 and the right and left rear wheels 16R and 16L are drive wheels for propelling the vehicle 10 along the ground. Of course, it will be apparent from this disclosure that only the right and left rear wheels 16R and 16L can be drive wheels.

Now, a powertrain of the vehicle 10 will be briefly discussed as it relates to the movement, the arrangement and/or the construction of the rear suspension assembly 22. The vehicle 10 comprises a motor 30 that is attached to the vehicle frame 12 in the rear portion 12B of the vehicle frame 12. Here, the motor 30 is an internal combustion engine. Alternatively, the motor 30 can be an electric motor. The motor 30 is operatively connected to a transmission 32 that is located forward of the motor 30. The motor 30 is disposed rearward of the transmission 32. Also, the motor 30 is located rearward of the seats 20R and 20L that are in the passenger compartment 12C. Alternatively, the motor 30 and the transmission 32 can be combined with the transmission 32 as a unit. Also, the transmission 32 can be located rearward of the motor 30 if needed and/or desired.

The transmission 32 is disposed on the vehicle frame 12. Here, the transmission 32 is preferably disposed along the vertical center plane CP of the vehicle 10. Preferably, for example, the transmission 32 is a sequential multi-speed manual transmission. Alternatively, the transmission 32 can be a CVT belt transmission with a propeller shaft running to a centrally located transfer case, or an automatic transmission having a torque converter. The transmission 32 is operatively connected to the motor 30 by an output shaft 35 (shown in FIG. 3 in dashed lines). The transmission 32 is operatively coupled to both the front wheels 18 and the right and left rear wheels 16R and 16L. The transmission 32 transmits torque to the front wheels 18 via a propeller shaft 33. Since the transmission of torque to the front wheels 18 does not directly affect the rear suspension assembly 22, the transmission of torque to the front wheels 18 will not be discussed and/or illustrated in detail herein. Rather, the transmission of torque to the front wheels 18 from the transmission 32 can be carried out using conventional techniques. The transmission 32 also transmits torque to the right and left rear wheels 16R and 16L via a rear differential 34. In other words, the transmission 32 is operatively connected to the rear differential 34 for supply torque to the right and left rear wheels 16R and 16L.

The transmission 32 is operatively connected to the rear differential 34 by a propeller shaft 36 to drive the right and left rear wheels 16R and 16L via the rear differential 34. The propeller shaft 36 is disposed along the vertical center plane CP of the vehicle 10. The transmission 32 transmits torque from the motor 30 to the rear differential 34 via the propeller shaft 36. Thus, the motor 30 operatively is connected to the rear differential 34 to drive the right and left rear wheels 16R and 16L via the rear differential 34. As illustrated in FIG. 3, the motor 30 is disposed between the transmission 32 and the rear differential 34. The rear differential 34 operatively connects to the left rear wheel 16L and the right rear wheel 16R. The rear differential 34 has a ring gear (not shown) that is connected to the right rear wheel 16R by a right drive shaft 38 and to the left rear wheel 16L by a left drive shaft 40. Preferably, the inboard and outboard ends of the right and left drive shafts 38 and 40 each has a constant variable joint. The rear differential 34 transmits torque from the propeller shaft 36 to the right rear wheel 16R via the right drive shaft 38 and to the left rear wheel 16L via the left drive shaft 40. In this way, in the illustrated embodiment, the motor 30 is operatively connected to the rear differential 34 to drive the right and left rear wheels 16R and 16L via the rear differential 34.

Turning to FIGS. 2-7, the right and left rear suspensions 26R and 26L will be discussed in more detail. The right and left rear suspensions 26R and 26L are shown in a resting position. Here, the terms "rest position" and "resting position" with respect to the right and left rear suspensions 26R and 26L refers to the vehicle 10 being supported by the right and left rear suspensions 26R and 26L with a 1 g of force (i.e., the force of gravity at the Earth's surface, which is 9.8 m/s$^2$). The right and left rear suspensions 26R and 26L are trailing arm suspensions with dual shock absorbers. The right rear suspension 26R is a mirror image of the left rear suspension 26L. Here, in the illustrated embodiment, the toe angles and the camber angles of the right and left rear wheels 16R and 16L are preset to zero and controlled through full suspension stroke to maintain zero toe and zero camber. However, it will be apparent that the toe angles and the camber angles of the right and left rear wheels 16R and 16L can be preset to a predetermined value other than zero and can be controlled through full suspension stroke to maintain the predetermined value.

Figure 4:
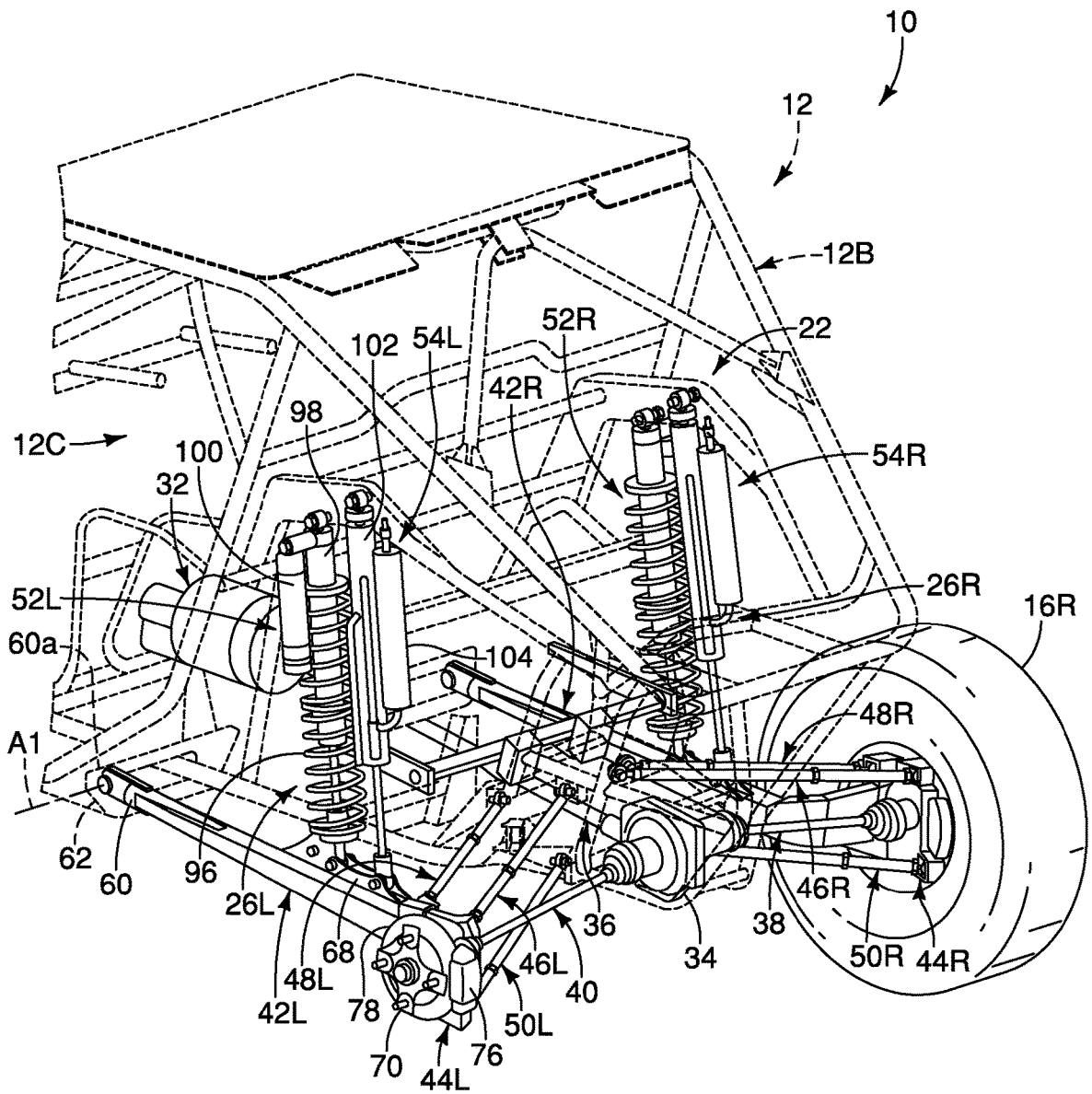
FIG. 4 is a partial perspective view of selected parts of a rear portion of the recreational off-highway vehicle illustrated in FIGS. 1 to 3 corresponding to the resting position (1 g of force) with various parts removed for purposes of illustration.

Basically, as seen in FIGS. 3 and 4, the right rear suspension 26R includes a trailing arm 42R, a floating rear knuckle 44R, a plurality of control links 46R, 48R and 50R, and a pair of shock absorbers 52R and 54R. In this embodiment, hereinafter, the control link 46R will be referred to as a first control link 46R, the control link 48R will be referred to as a second control link 48R, and the control link 50R will be referred to as a third control link 50R. Also, in this embodiment, hereinafter, the shock absorber 52R will be referred to as a first shock absorber 52R, and the shock absorber 54R will be referred to as a second shock absorber 54R.

Like the right rear suspension 26R, as seen in FIGS. 3 and 4, the left rear suspension 26L includes a trailing arm 42L, a floating rear knuckle 44L, a plurality of control links 46L, 48L and 50L, and a pair of shock absorbers 52L and 54L. In this embodiment, hereinafter, the control link 46L will be referred to as a first control link 46L, the control link 48L will be referred to as a second control link 48L, and the control link 50L will be referred to as a third control link 50L. Also, in this embodiment, hereinafter, the shock absorber 52L will be referred to as a first shock absorber 52L, and the shock absorber 54L will be referred to as a second shock absorber 54L.

Figure 8:
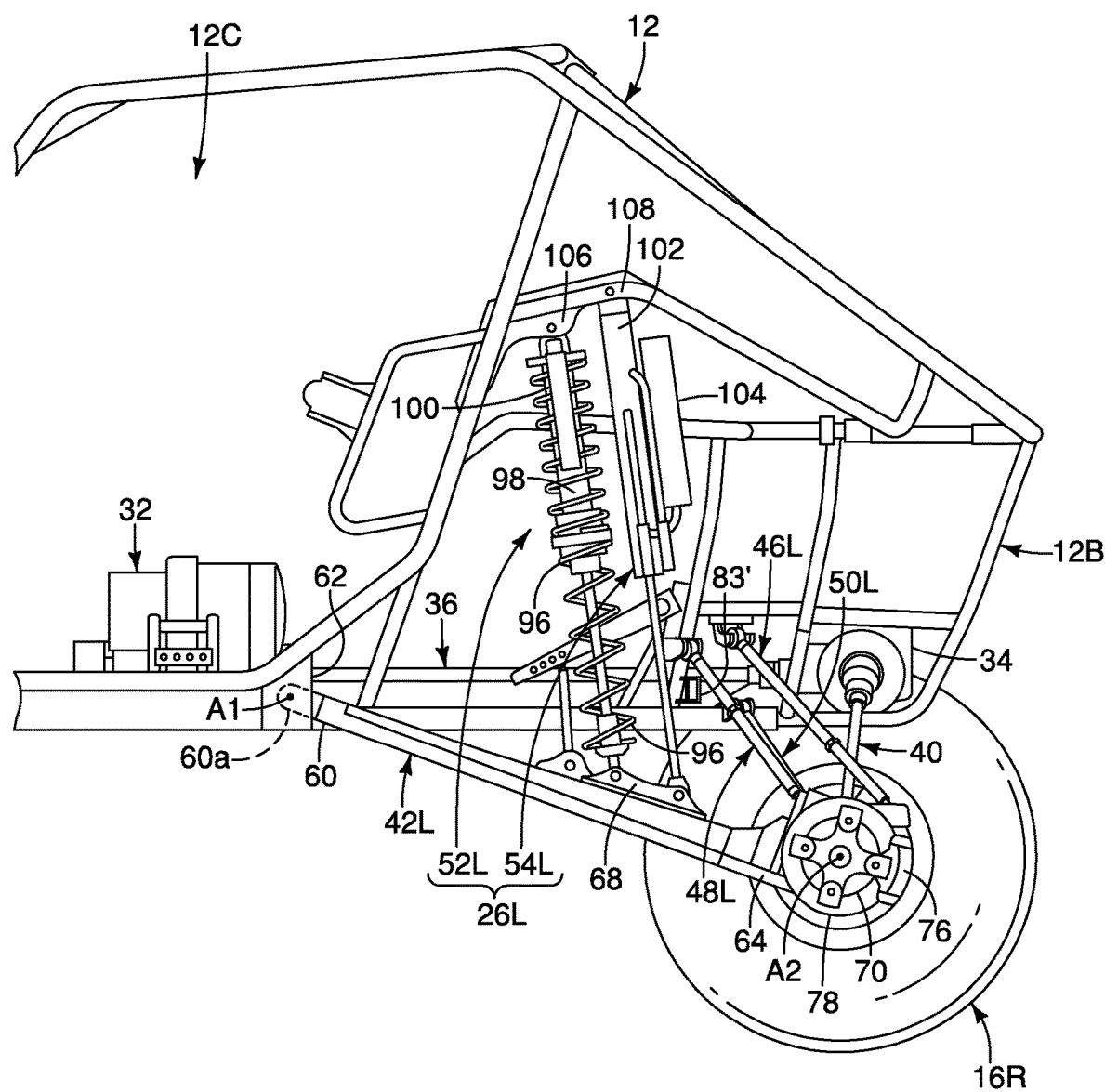
FIG. 8 is a left side elevational view, similar to FIG. 5, of the parts of the recreational off-highway vehicle illustrated in FIG. 4 but corresponding to a full extension position.
Figure 9:
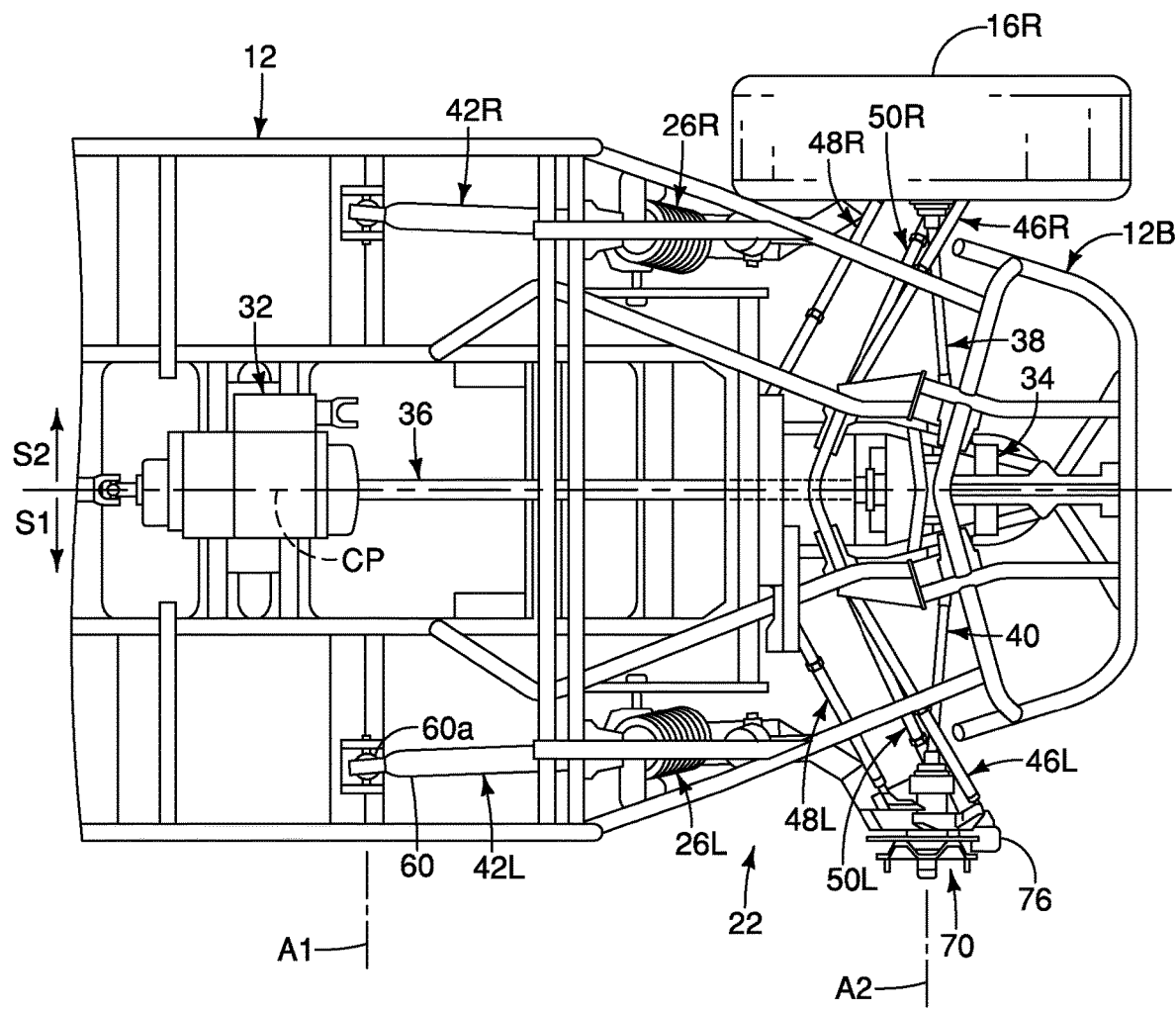
FIG. 9 is a top plan view, similar to FIG. 6, of the parts of the recreational off-highway vehicle illustrated in FIG. 8 corresponding to the full extension position.
Figure 10:
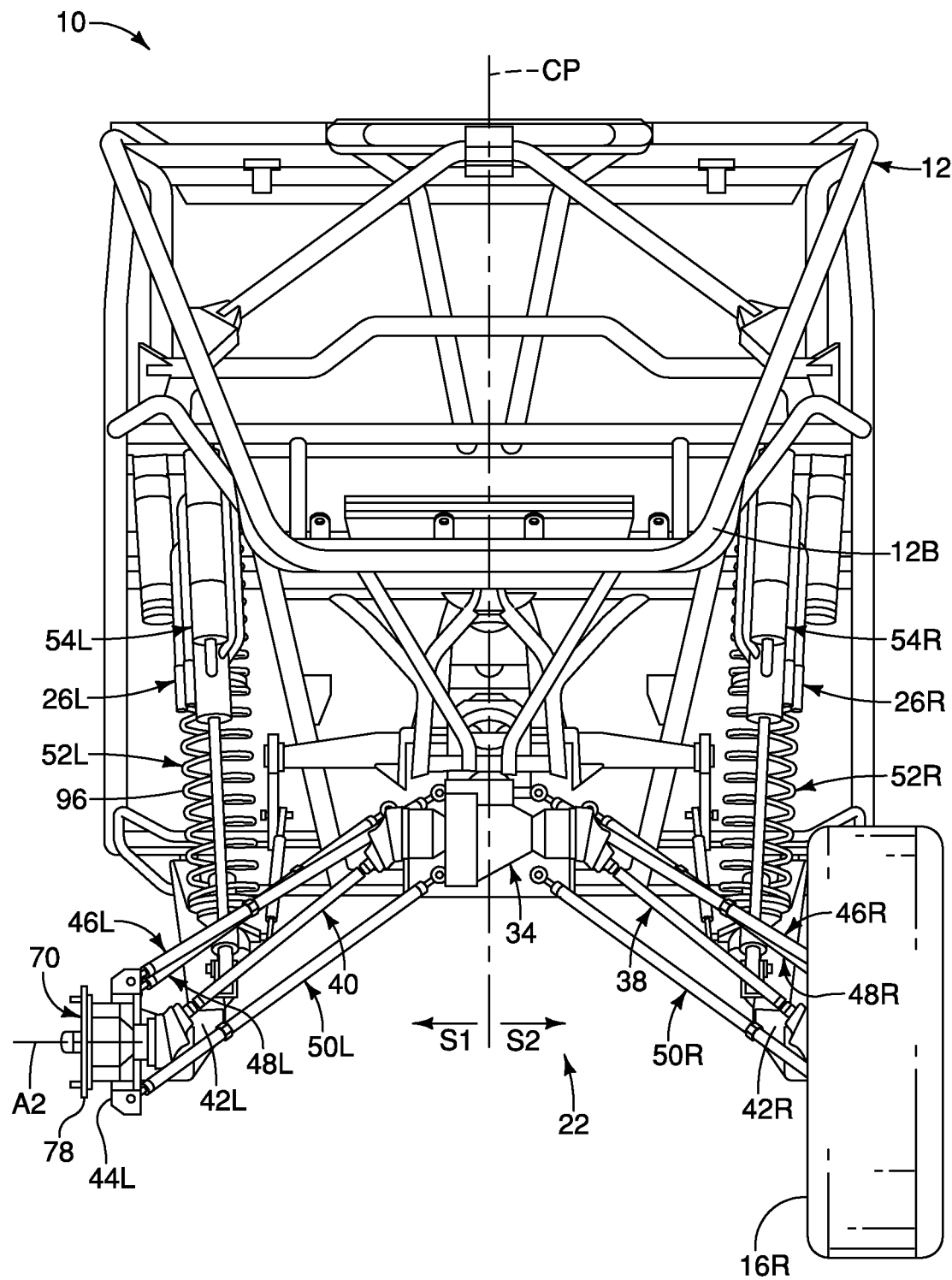
FIG. 10 is a rear elevational view of the parts of the recreational off-highway vehicle illustrated in FIGS. 8 and 9 corresponding to the full extension position, with a portion of the frame broken away.

Turning to FIGS. 8-10, the right and left rear suspensions 26R and 26L are illustrated in full extension positions. In other words, the right and left rear suspensions 26R and 26L are extended to their maximum extent. The full extension positions of the right and left rear suspensions 26R and 26L can be established by one or more limit straps (not shown) that are connected between the vehicle frame 12 and the trailing arms 42R and 42L. Alternatively, the full extension positions of the right and left rear suspensions 26R and 26L can be established by either the first shock absorbers 52R and 52L reaching a maximum extension amount or the second shock absorbers 54R and 54L reaching a maximum extension amount. With the right and left rear suspensions 26R and 26L, the full stroke of the at least one shock absorber of each of the right and left rear suspensions 26R and 26L provides more than 620 millimeters of travel for the right and left rear wheels 16R and 16RL.

Here, as seen in FIGS. 9 and 10, the right and left rear suspensions 26R and 26L are configured to maintain the right and left rear wheels 16R and 16L with a zero toe and a zero camber at the full extension positions. In other words, as seen in FIG. 9, the toe angles of the right and left rear wheels 16R and 16L at the full extension positions of the right and left rear suspensions 26R and 26L do not change from the toe angles of the right and left rear wheels 16R and 16L at the rest positions (1 g positions) of the right and left rear suspensions 26R and 26L. Likewise, as seen in FIG. 10, the camber angles of the right and left rear wheels 16R and 16L at the full extension positions of the right and left rear suspensions 26R and 26L do not change from the camber angles of the right and left rear wheels 16R and 16L at the rest positions (1 g positions) of the right and left rear suspensions 26R and 26L.

Figure 11:
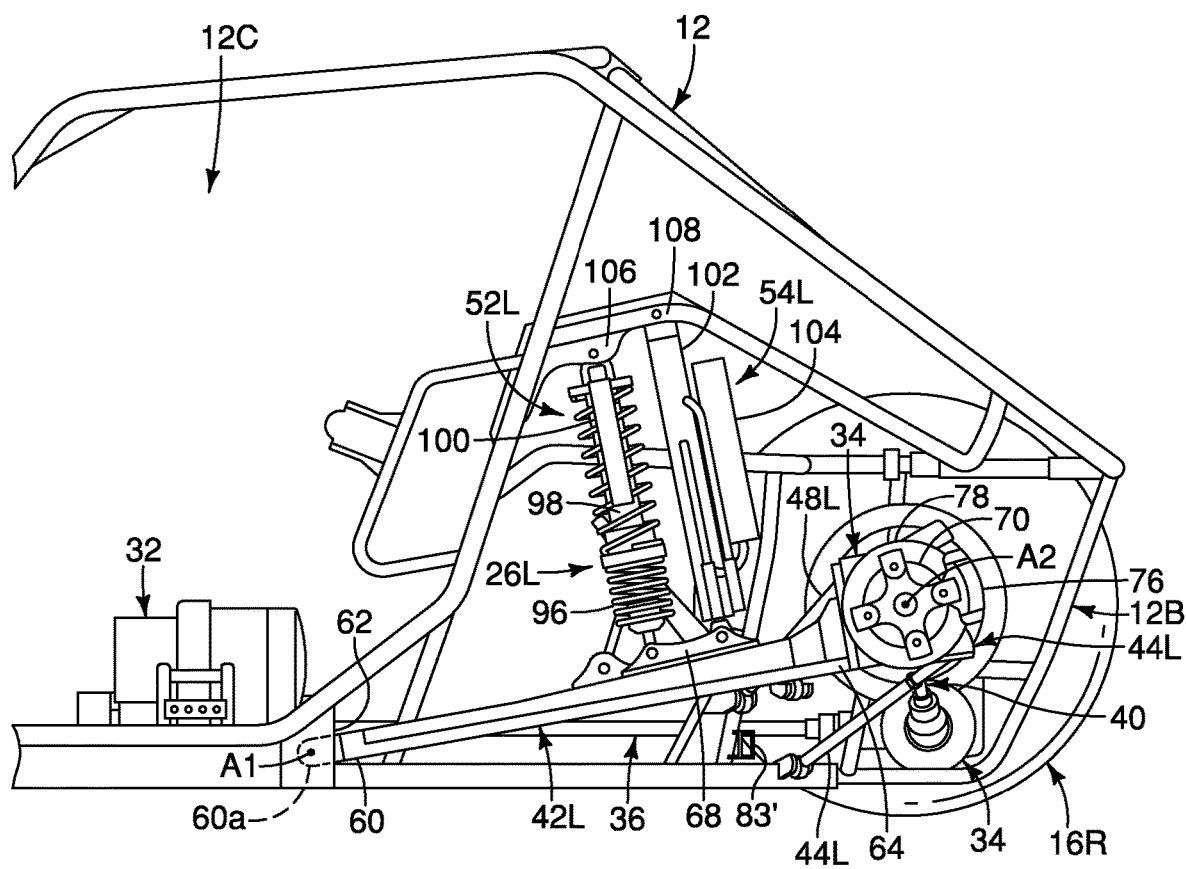
FIG. 11 is a left side elevational view, similar to FIGS. 5 and 8, of the parts of the recreational off-highway vehicle illustrated in FIG. 4 but corresponding to a full compression position.
Figure 12:
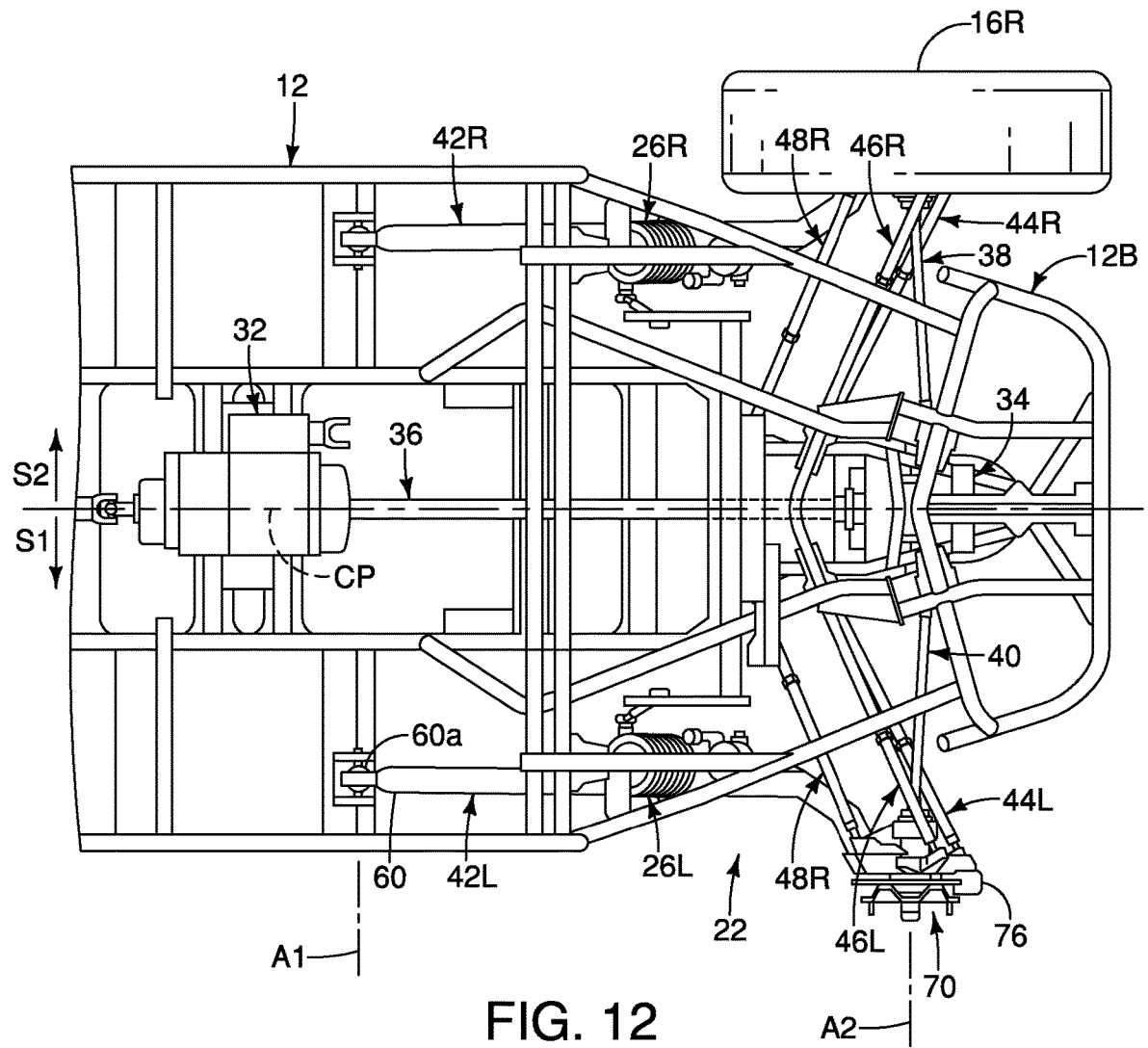
FIG. 12 is a top plan view, similar to FIGS. 6 and 9, of the parts of the recreational off-highway vehicle illustrated in FIG. 13 corresponding to the full compression position.
Figure 13:
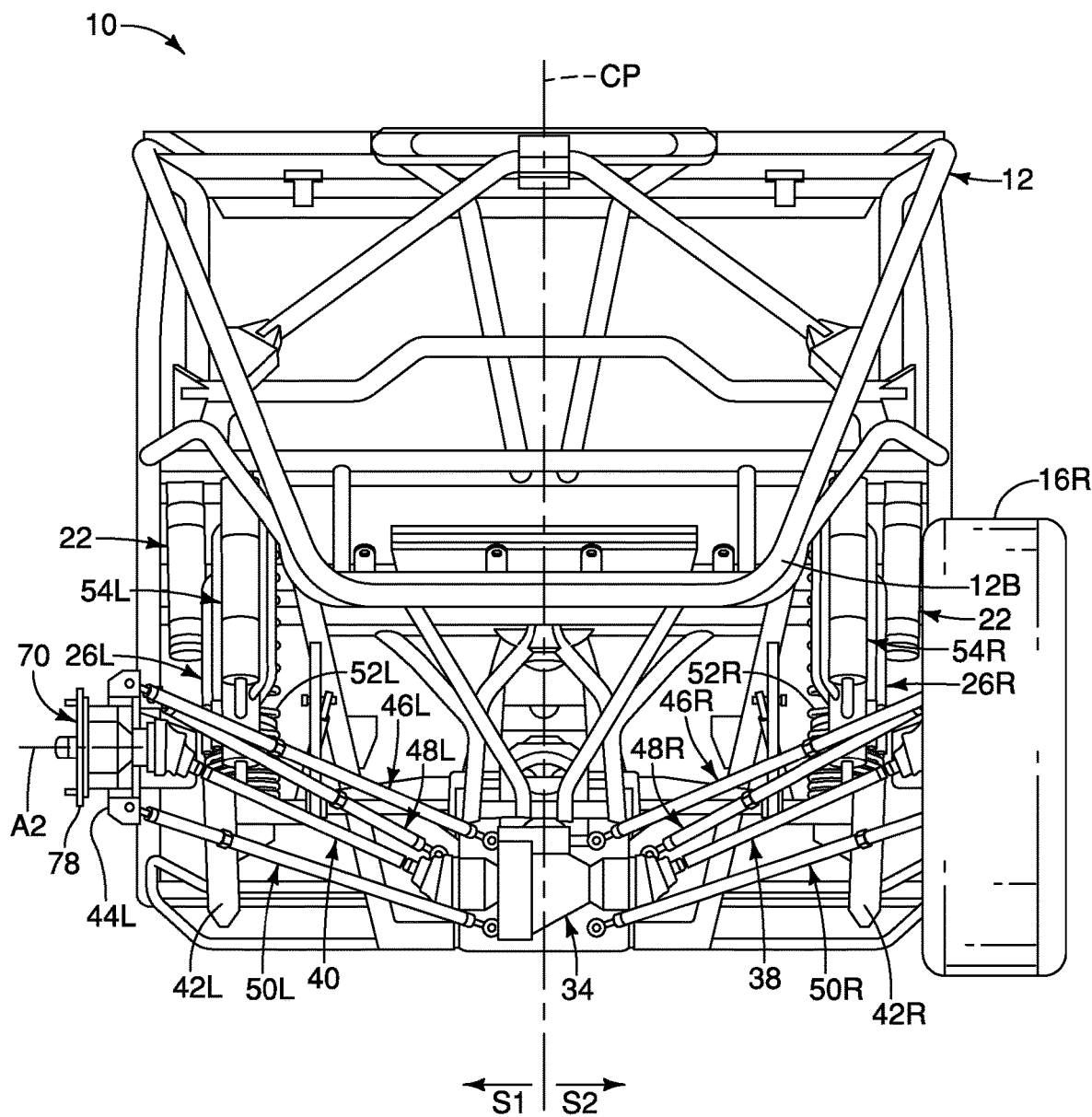
FIG. 13 is a rear elevational view, similar to FIGS. 7 and 10, of the parts of the recreational off-highway vehicle illustrated in FIGS. 11 and 12 corresponding to the full compression position, with a portion of the frame broken away.
Figure 14:
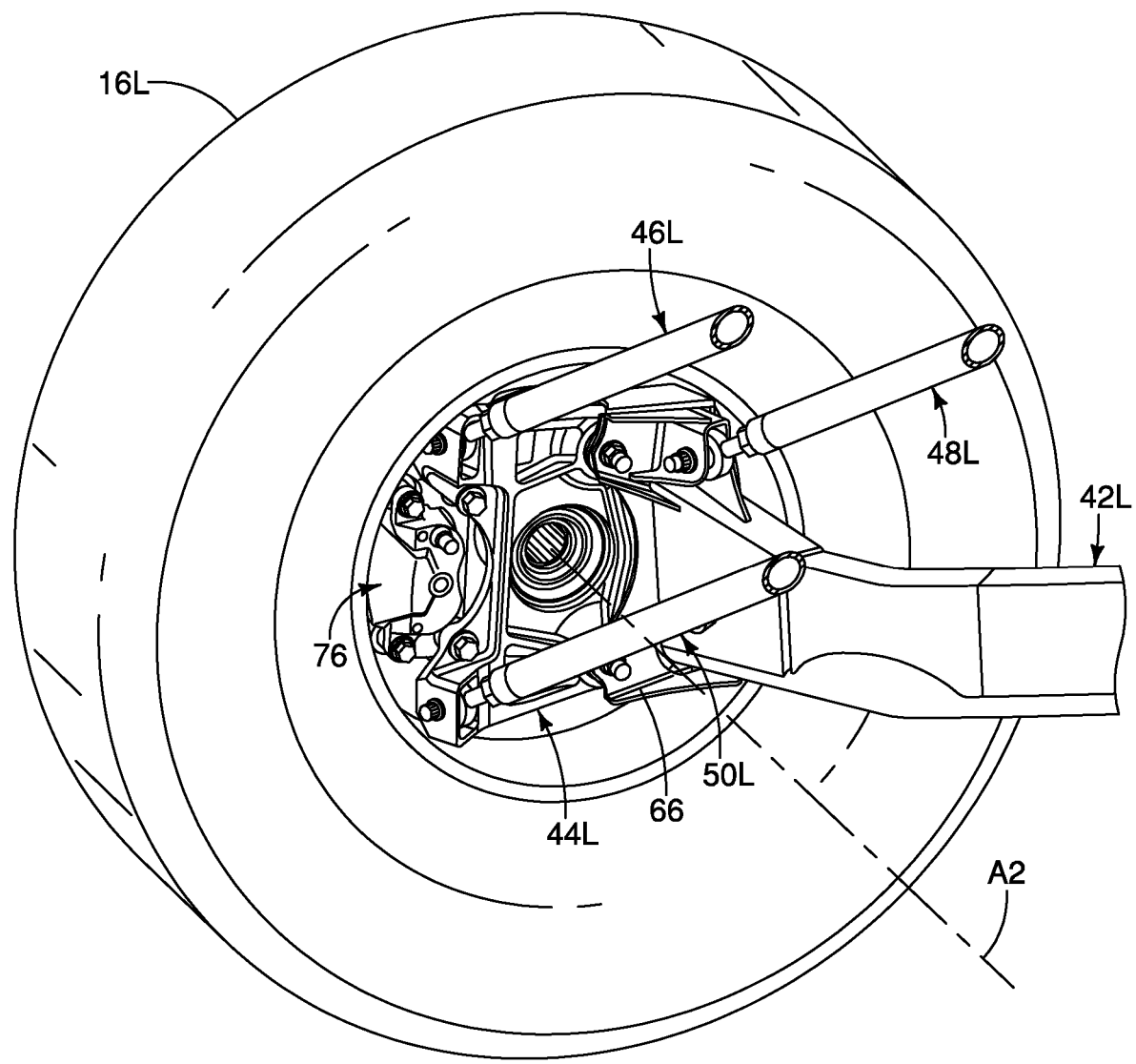
FIG. 14 is a partial perspective view of a portion of the left rear suspension of the recreational off-highway vehicle illustrated in FIGS. 1 to 13.

Turning to FIGS. 11-13, the right and left rear suspensions 26R and 26L are illustrated in full compression positions. In other words, the right and left rear suspensions 26R and 26L are retracted to their maximum compression. The full compression positions of the right and left rear suspensions 26R and 26L can be established by either the first shock absorbers 52R and 52L reaching a maximum compression amount or the second shock absorbers 54R and 54L reaching a maximum compression amount. Here, as seen in FIGS. 12 and 13, the right and left rear suspensions 26R and 26L are configured to maintain the right and left rear wheels 16R and 16L with a zero toe and a zero camber at the full compression positions. In other words, as seen in FIG. 12, the toe angles of the right and left rear wheels 16R and 16L at the full compression positions of the right and left rear suspensions 26R and 26L do not change from the toe angles of the right and left rear wheels 16R and 16L at the rest positions (1 g positions) of the right and left rear suspensions 26R and 26L. Likewise, as seen in FIG. 13, the camber angles of the right and left rear wheels 16R and 16L at the full compression positions of the right and left rear suspensions 26R and 26L do not change from the camber angles of the right and left rear wheels 16R and 16L at the rest positions (1 g positions) of the right and left rear suspensions 26R and 26L.

Since the right rear suspension 26R is a mirror image of the left rear suspension 26L, for the sake of brevity, only the left rear suspension 26L will be discussed and illustrated in detail. However, the description of the left rear suspension 26L applies to the right rear suspension 26R but taking into account that they are mirror images.

Referring now to FIGS. 3 to 7 and 14 to 19, the left rear suspension 26L will now be discussed in more detail. The trailing arm 42L, the floating rear knuckle 44L, the control links 46L, 48L and 50L are preferably made of a suitable rigid metallic material such as steel, aluminum, titanium, etc. It is also contemplated that the trailing arm 42L, the floating rear knuckle 44L, the control links 46L, 48L and 50L could be made of a non-metallic material, such as reinforced composite materials such as fiber reinforced plastics.

Figure 5:
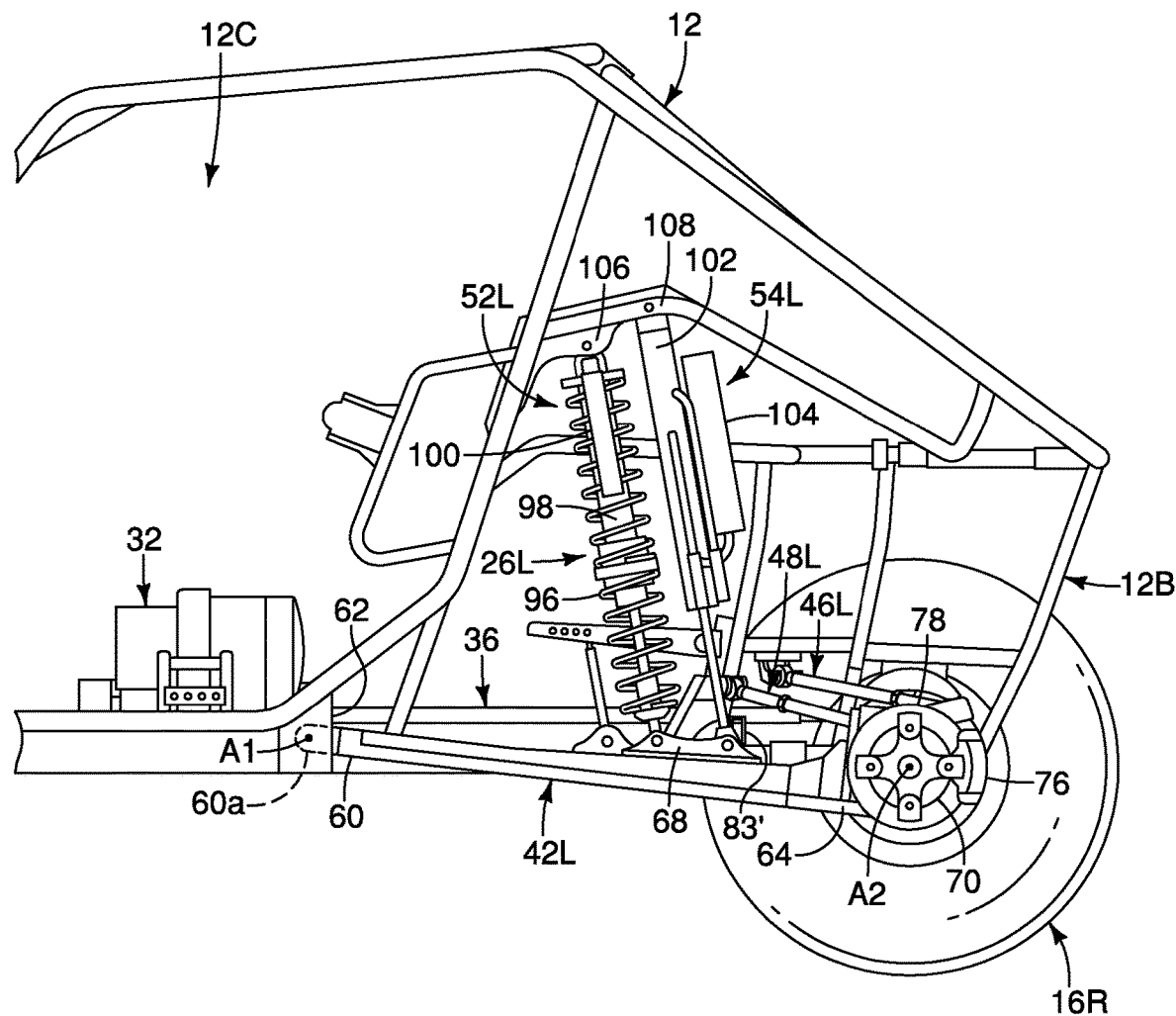
FIG. 5 is a left side elevational view of selected parts of the rear portion of the recreational off-highway vehicle illustrated in FIG. 4 corresponding to the resting position (1 g of force)
Figure 6:
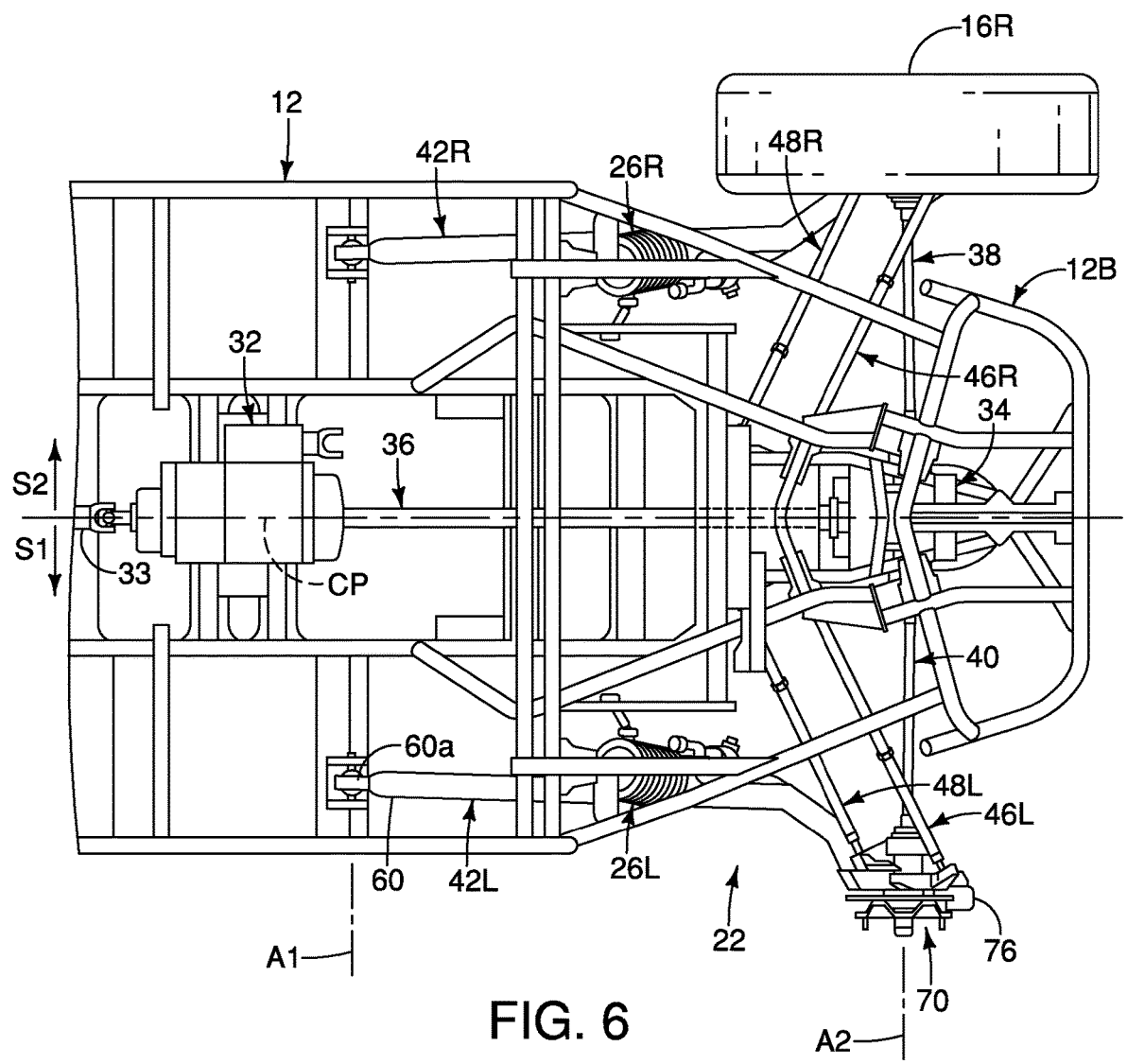
FIG. 6 is a top plan view of the parts of the recreational off-highway vehicle illustrated in FIGS. 4 and 5 corresponding to the resting position (1 g of force)
Figure 7:
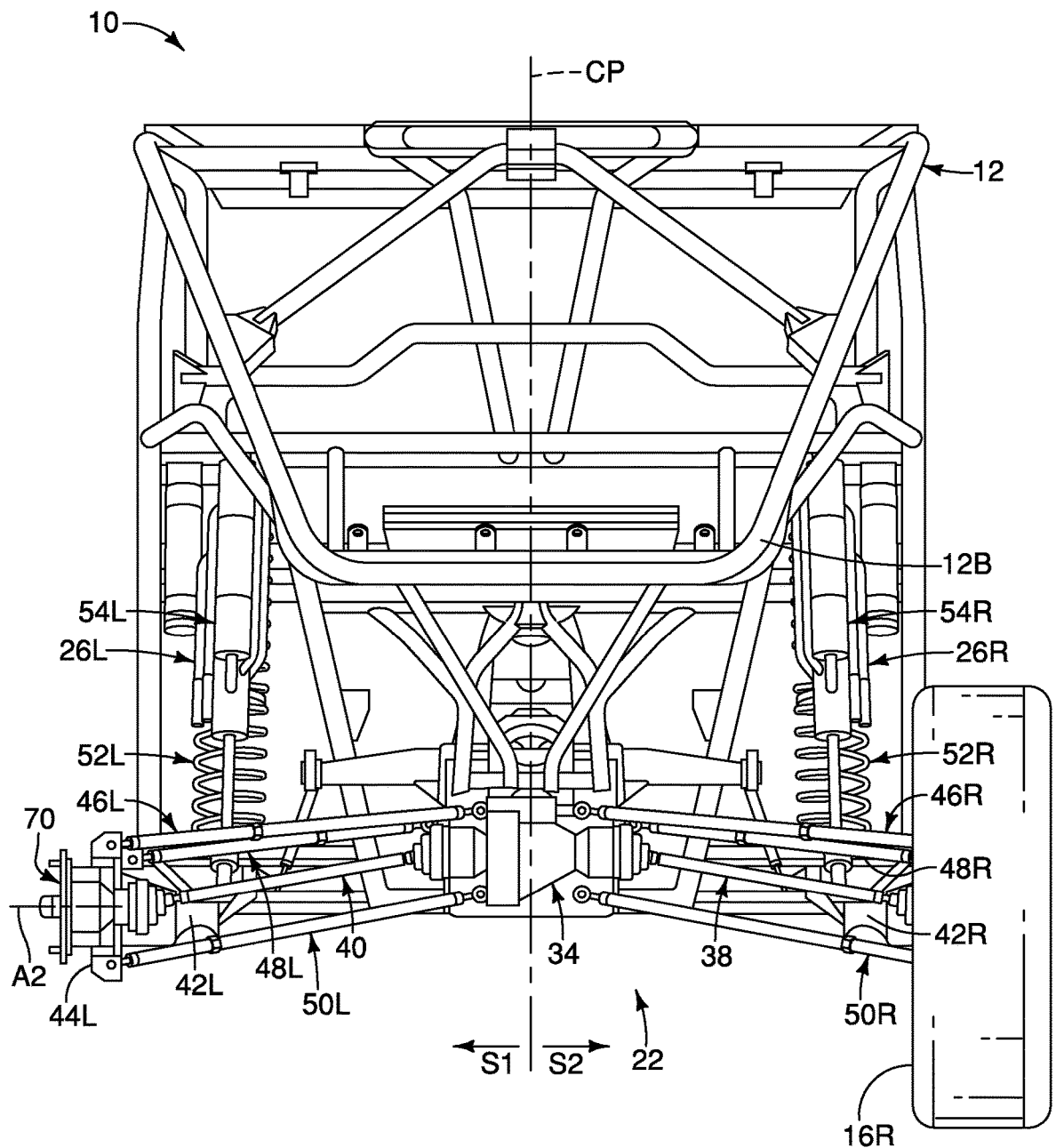
FIG. 7 is a rear elevational view of the parts of the recreational off-highway vehicle illustrated in FIGS. 4 to 6 corresponding to the resting position (1 g of force), with a portion of the frame broken away.

Basically, as seen FIGS. 3 to 5, the trailing arm 42L has a front end 60 that is pivotally connected to the vehicle frame 12. More specifically, the vehicle frame 12 has a trailing arm mount 62 that pivotally supports the front end 60 the trailing arm 42L about a front pivot axis A1. Here, the front end 60 includes a mechanical articulating joint 60a (e.g., preferably a Heim joint) that has a casing with a ball swivel movably supported therein and a threaded shaft attached thereto. The ball swivel has an opening through which a bolt or other attaching hardware passes. The mechanical articulating joint 60a is also called a spherical bearing that provides multiple degrees of freedom of movement. Since mechanical articulating joints are well known, the mechanical articulating joint 60a will not be discussed herein. The trailing arm 42L has a rear end 64 that is attached to the floating rear knuckle 44L. The rear end 64 of the trailing arm 42L terminates forward of a transverse driveshaft axis A2 of the rear hub 70. Here, a knuckle mount 66 is attached to the rear end 64 of the trailing arm 42L. Here, the knuckle mount 66 is bolted to the floating rear knuckle 44L. The trailing arm 42L further includes a shock absorber mount 68 that pivotally supports the lower ends of the first and second shock absorbers 52L and 54L. As explained later, at least one of the control links 46L, 48L and 50L is mounted to the trailing arm 42L to control scrub/sweep of the left rear wheel 16L.

As seen in FIGS. 4 to 7, a rear hub 70 is rotatably supported to the floating rear knuckle 44L. The rear hub 70 can be any type of rear hub for mounting the left rear wheel 16L to the floating rear knuckle 44L so that the left rear wheel 16L and the rear hub 70 rotate together relative to the floating rear knuckle 44L. The rear hub 70 is configured to removably mount the left rear wheel 16L in a conventional manner. The rear hub 70 includes a splined tubular portion for receiving an end of the left drive shaft 40 in a conventional manner. In this way, torque from the left drive shaft 40 is transmitted to the rear hub 70 so that the left rear wheel 16L rotates in response to rotation of the left drive shaft 40.

Turning now to the mounting of the first, second and third control links 46L, 48L and 50L to the trailing arm 42L and/or the floating rear knuckle 44L of the left rear suspension 26L, as mentioned above, the floating rear knuckle 44L is connected to the rear end of the trailing arm 42L such that the floating rear knuckle 44L can swing (up and down) in a vertical direction with respect to the vehicle frame 12 about the front pivot axis A1 as seen in FIGS. 5, 8 and 11. At least one of the first, second and third control links 46L, 48L and 50L is pivotally mounted to the floating rear knuckle 44L for controlling the toe angle of the left rear wheel 16L. Also at least one of the first, second and third control links 46L, 48L and 50L is pivotally mounted to the trailing arm 42L for controlling the scrub/sweep of the left rear wheel 16L.

Figure 15:
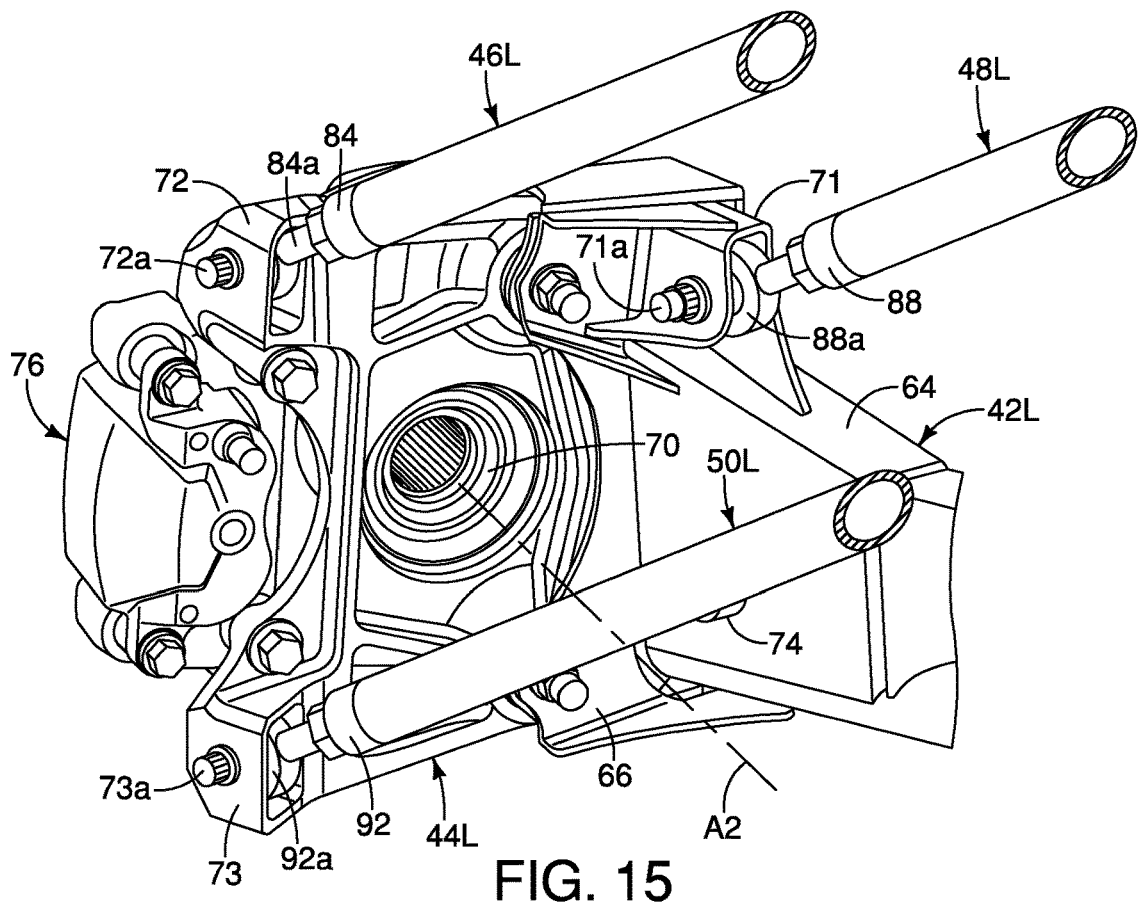
FIG. 15 is a partial perspective view of the portion of the left rear suspension illustrated in FIG. 14, but with the left rear wheel removed.
Figure 16:
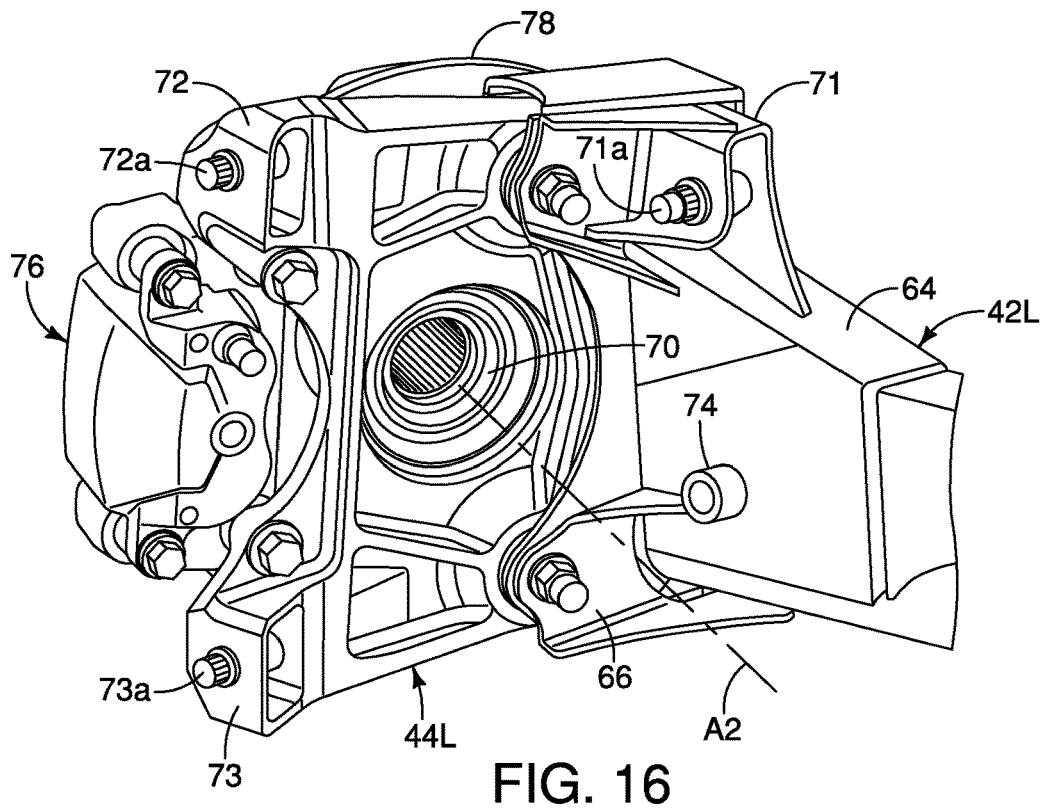
FIG. 16 is a partial perspective view of the portion of the left rear suspension illustrated in FIG. 15, but with the control links removed.
Figure 17:
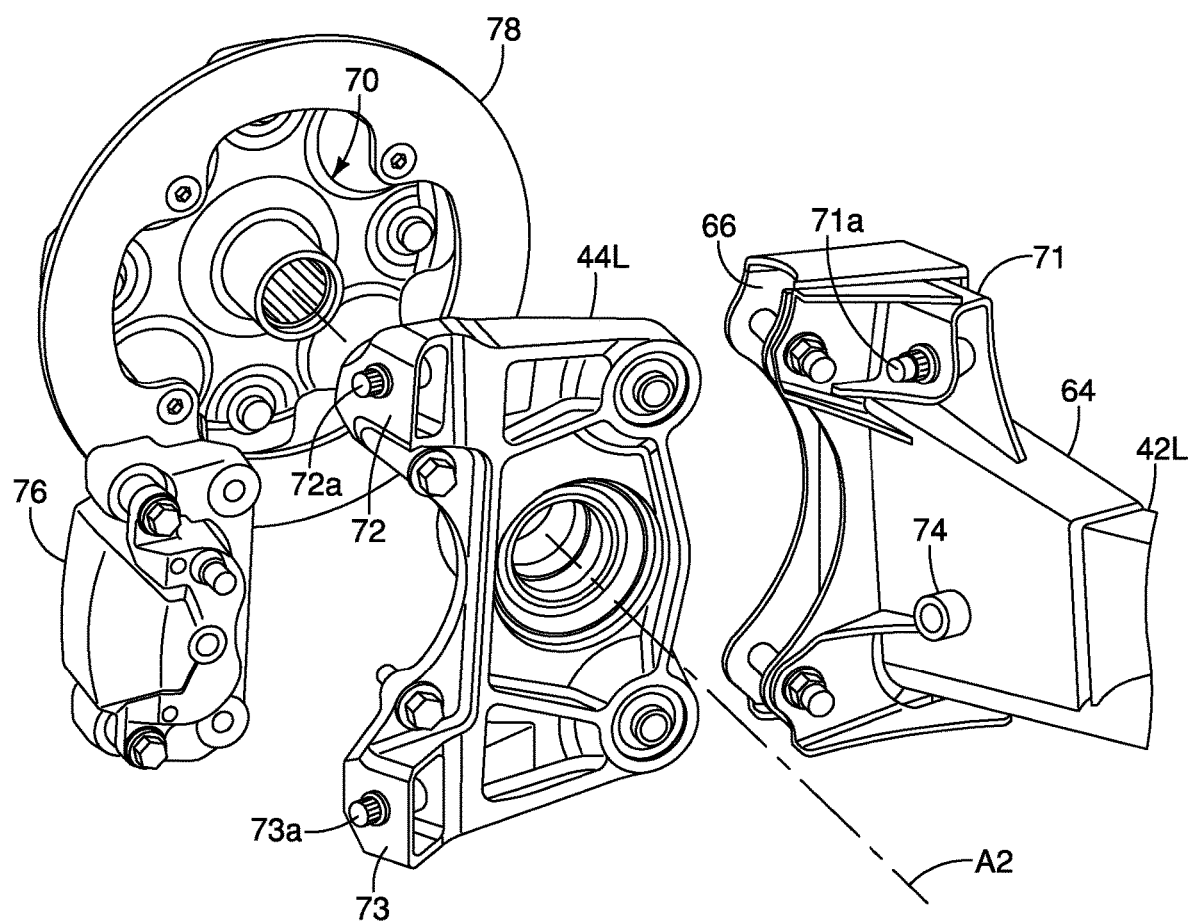
FIG. 17 is an exploded perspective view of the parts of the portion of the left rear suspension illustrated in FIG. 16.
Figure 18:
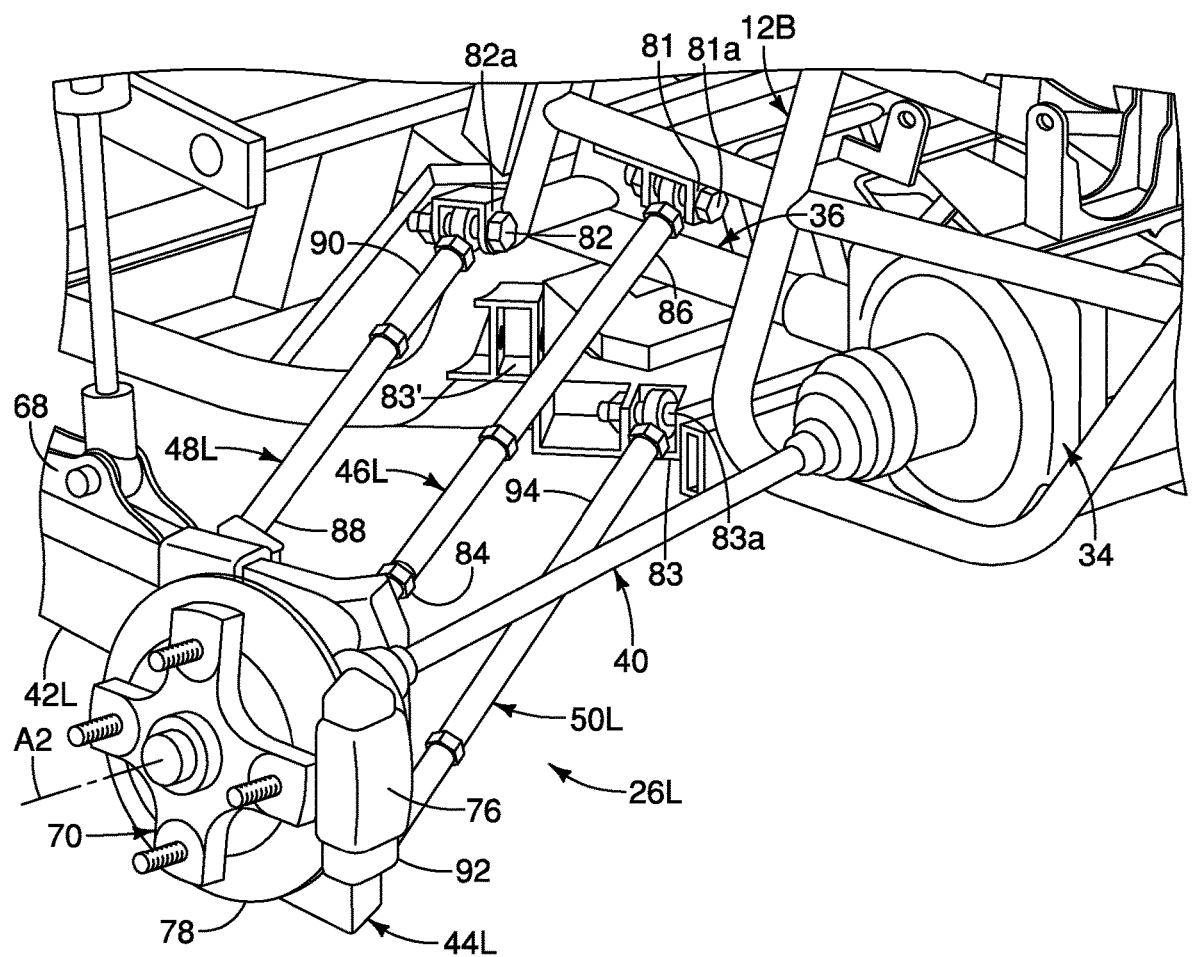
FIG. 18 is an enlarged partial perspective view of a portion of the left rear suspension illustrated in FIG. 4.

As seen in FIGS. 15 to 17, the trailing arm 42L includes an upper control link mount 71 that is configured to pivotally mount the second control link 48L via a pivot pin 71a. On the other hand, the floating rear knuckle 44L includes an upper control link mount 72 and a lower control link mount 73. The upper control link mount 72 of the floating rear knuckle 44L is configured to pivotally mount the first control link 46L via a pivot pin 72a. The lower control link mount 73 of the floating rear knuckle 44L is configured to pivotally mount the third control link 50L via a pivot pin 73a. Here, optionally, the floating rear knuckle 44L further includes an alternate lower control link mount 74 to pivotally support the third control link 50L to the trailing arm 42L via a pivot pin 74a as shown in a modified configuration in FIG. 20. Of course, the alternate lower control link mount 74 can be omitted as needed and/or desired.

A brake disc caliper 76 is mounted on the floating rear knuckle 44L. In the illustrated embodiment, the brake caliper 76 is mounted rearward of the centerline of the transverse driveshaft axis A2 of the rear hub 70. The brake caliper 76 can be mounted to a rear portion of the floating rear knuckle 44L, for example, by either an integral caliper carrier, or by using a separate caliper carrier. Alternatively, the brake caliper 76 is mounted forward of the transverse driveshaft axis A2 of the rear hub 70. The brake disc caliper 76 is configured to squeeze a brake rotor 78 that is mounted to the rear hub 70. In this way, the rotation of the left rear wheel 16L can be slowed or stopped. The brake disc caliper 76 is a part of a vehicle braking system for the vehicle 10. The brake disc caliper 76 can be, for example, an electrically operated brake disc caliper or a hydraulically operated brake disc caliper. Since brake disc calipers are well known, the brake disc caliper 76 will not be illustrated or described in detail.

Figure 19:
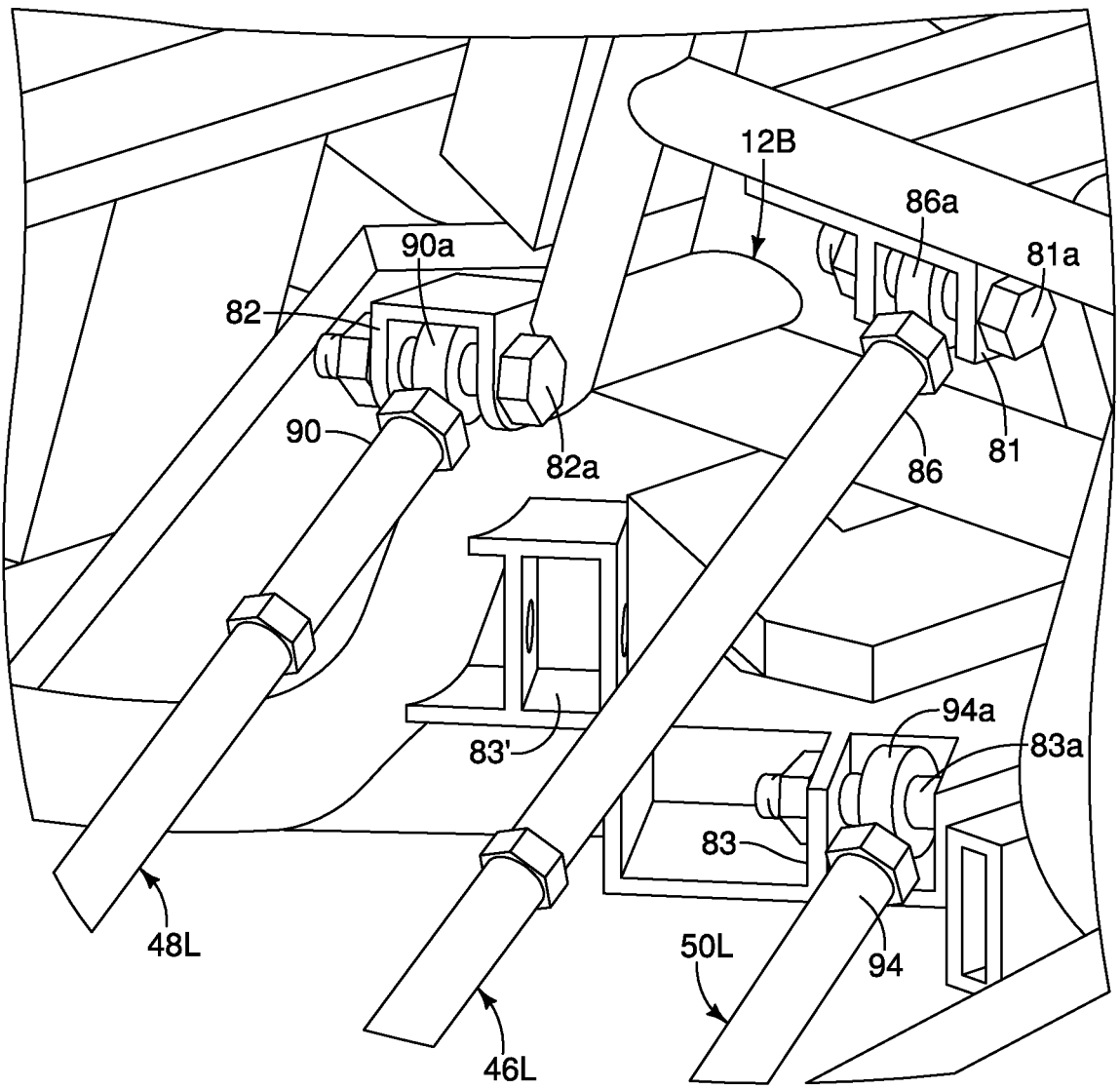
FIG. 19 is a further enlarged partial perspective view of the frame attachment portions illustrated in FIG. 18.

Turning now to the first, second and third control links 46L, 48L and 50L of the left rear suspension 26L, basically, each of the first, second and third control links 46L, 48L and 50L has a front end pivotally mounted to the vehicle frame 12. The front ends of the first, second and third control links 46L, 48L and 50L are all mounted to the vehicle frame 12 forward of the centerline of the transverse driveshaft axis A2 of the rear hub 70. Here, as seen in FIG. 19, the rear portion 12B of the vehicle frame 12 is provided with a first control link mount 81, a second control link mount 82 and a third control link mount 83. The first control link mount 81 has a first pivot pin 81a that connects the first control link 46L to the rear portion 12B of the vehicle frame 12. The second control link mount 82 has a second pivot pin 82a that connects the second control link 48L to the rear portion 12B of the vehicle frame 12. The third control link mount 83 has a third pivot pin 83a that connects the third control link 50L to the rear portion 12B of the vehicle frame 12.

Figure 20:
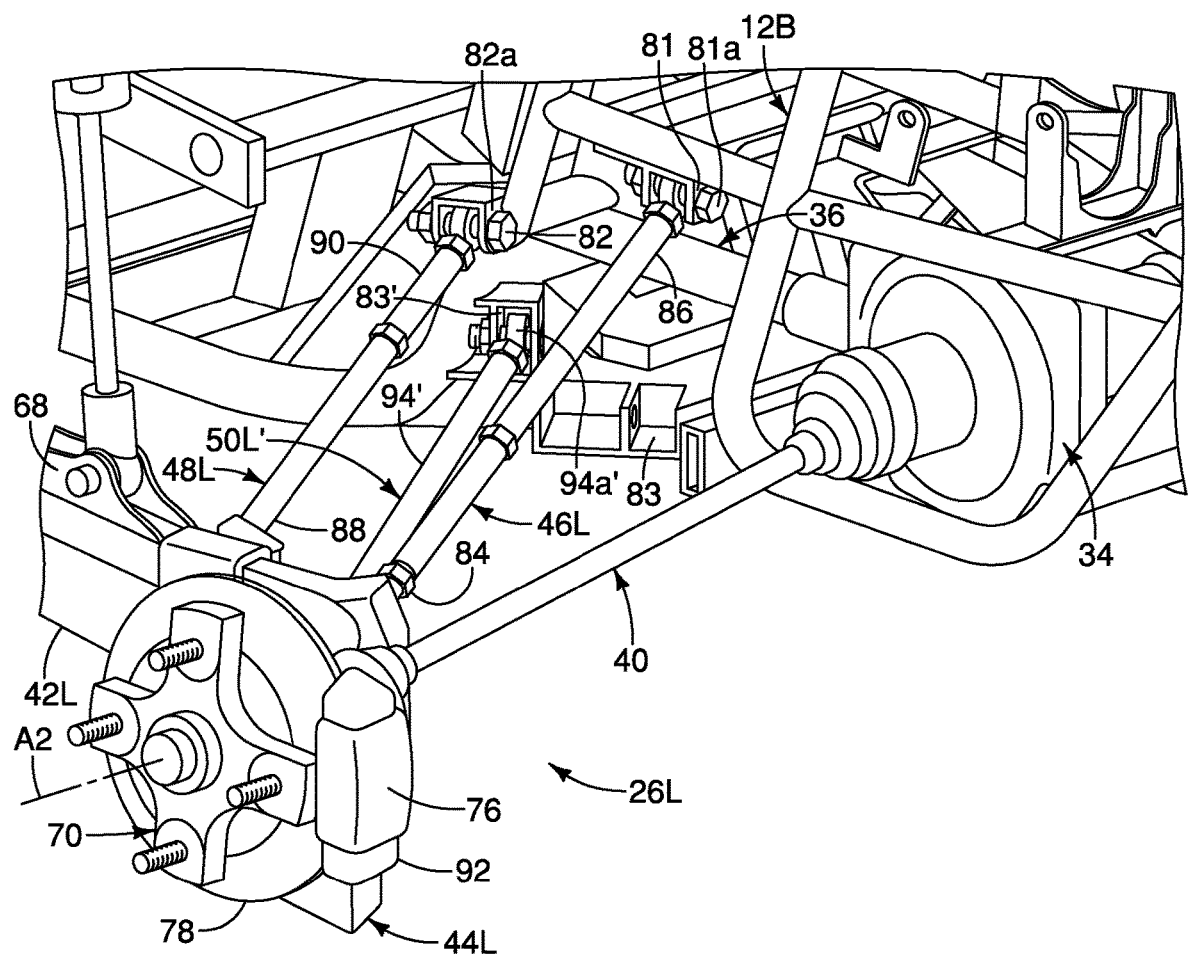
FIG. 20 is an enlarged partial perspective view of a portion of a modified left rear suspension.

Also, each of the first, second and third control links 46L, 48L and 50L has a rear end pivotally mounted to either the floating rear knuckle 44L or the rear end 64 of the trailing arm 42L as discussed below. As seen in FIG. 15, the rear end of the second control link 48L is mounted to the trailing arm 42L forward of the centerline of the transverse driveshaft axis A2 of the rear hub 70, while the rear ends of the first and third control links 46L and 50L are mounted to the floating rear knuckle 44L rearward of the centerline of the transverse driveshaft axis A2 of the rear hub 70. Alternatively, the rear end of the third control link 50L is mounted to the trailing arm 42L forward of the centerline of the transverse driveshaft axis A2 of the rear hub 70 as seen in FIG. 20.

More specifically, the first control link 46L has a first or rear end 84 and a second or front end 86. Preferably, the first control link 46L is adjustable in length. Alternatively, the first control link 46L has a fixed length (i.e., non-adjustable in length). Here, the first end 84 of the first control link 46L includes a first mechanical articulating joint 84a (e.g., preferably a Heim joint), while the second end 86 of the first control link 46L includes a second mechanical articulating joint 86a (e.g., preferably a Heim joint). The first and second mechanical articulating joints 84a and 86a that provide multiple degrees of freedom of movement. The first control link 46L is arranged to cross the left drive shaft 40 connecting the rear differential 34 to the left rear wheel as viewed in a top plan view. In particular, the first control link 46L is arranged to cross above the left drive shaft 40.

The first end 84 of the first control link 46L movably supports the floating rear knuckle 44L via the first mechanical articulating joint 84a. The first mechanical articulating joint 84a is mounted on the pivot pin 72a of the upper control link mount 72 of the floating rear knuckle 44L. The first end 84 of the first control link 46L is connected to the floating rear knuckle 44L rearward of the left drive shaft 40 that connects the rear differential 34 to the left rear wheel 16L.

The second end 86 of the first control link 46L is pivotally connected to the vehicle frame 12 forward of the rear differential 34 via the second mechanical articulating joint 86a. The second mechanical articulating joint 86a is mounted on the pivot pin 81a of the first control link mount 81 of the vehicle frame 12. The second end 86 of the first control link 46L is located between the motor 30 and the rear differential 34 as viewed in a side elevational view.

The second control link 48L has a first or rear end 88 and a second or front end 90. Preferably, the second control link 48L is adjustable in length. Alternatively, the second control link 48L has a fixed length (i.e., non-adjustable in length). Here, the first end 88 of the second control link 48L includes a first mechanical articulating joint 88a (e.g., preferably a Heim joint), while the second end 80 of the second control link 48L includes a second mechanical articulating joint 90a (e.g., preferably a Heim joint). The first and second mechanical articulating joints 88a and 90a that provide multiple degrees of freedom of movement.

The first end 88 of the second control link 48L movably supports the trailing arm 42L via the first mechanical articulating joint 88a. The first mechanical articulating joint 88a is mounted on the pivot pin 71a of the upper control link mount 71 of the trailing arm 42L. The first end of 88 the second control link 48L is connected to the trailing arm 42L forward of the left drive shaft 40 that connects the rear differential 34 to the left rear wheel 16L.

The second end 90 of the second control link 48L pivotally connects the vehicle frame 12 forward of the rear differential 34 via the second mechanical articulating joint 90a. The second mechanical articulating joint 90a is mounted on the pivot pin 82a of the second control link mount 82 of the vehicle frame 12. The second end 90 of the second control link 48L is located between the motor 30 and the rear differential 34 as viewed in a side elevational view.

The third control link 50L has a first or rear end 92 and a second or front end 94. Preferably, the third control link 50L is adjustable in length. Alternatively, the third control link 50L has a fixed length (i.e., non-adjustable in length). Here, the first end 92 of the third control link 50L includes a first mechanical articulating joint 92a (e.g., preferably a Heim joint), while the second end 94 of the third control link 50L includes a second mechanical articulating joint 94a (e.g., preferably a Heim joint). The first and second mechanical articulating joints 92a and 94a that provide multiple degrees of freedom of movement. The third control link 50L is arranged to cross the left drive shaft 40 connecting the rear differential 34 to the left rear wheel as viewed in a top plan view. In particular, the third control link 50L is arranged to cross below the left drive shaft 40.

The first end 92 of the third control link 50L movably supports the floating rear knuckle 44L via the first mechanical articulating joint 92a. The first mechanical articulating joint 92a is mounted on the pivot pin 73a of the lower control link mount 73 of the floating rear knuckle 44L. The first end 92 of the third control link 50L is connected to the floating rear knuckle 44L rearward of the left drive shaft 40 that connects the rear differential 34 to the left rear wheel 16L.

The second end 94 pivotally connects the vehicle frame 12 forward of the rear differential 34 via the second mechanical articulating joint 94a. The second mechanical articulating joint 94a is mounted on the pivot pin 83a of the third control link mount 83 of the vehicle frame 12. The second end of the third control link 50L is located between the motor 30 and the rear differential 34 as viewed in a side elevational view.

The first shock absorber 52L is a coil-over internal bypass shock absorber that has dual coil springs 96, a shock 98 extending inside of the coil springs 96 and a reservoir 100 fluidly connected to the shock 98. The second shock absorber 54L is an external bypass shock absorber that has a shock 102 fluidly connected to a reservoir 104. The first shock absorber 52L and the second shock absorber 54L are nitrogen charged hydraulic units. The first shock absorber 52L uses the springs 96 to hold up the vehicle 10 while providing broad secondary damping characteristics. The second shock absorber 54L provides primary damping through use of multiple externally adjustable bypass tubes occupying space where typically a spring would be used. Thus, the first shock absorber 52L has a first damping characteristic, while the second shock absorber 54L has a second damping characteristic. The second damping characteristic of the second shock absorber 54L is different from the first damping characteristic of the first shock absorber 52L.

The lower ends of the first and second shock absorbers 52L and 54L are pivotally connected to the shock absorber mount 68 provided on the trailing arm 42L, while the upper ends of the first and second shock absorbers 52L and 54L are pivotally connected to the shock absorber mounts 106 and 108 provided on the vehicle frame 12. The lower and upper ends of the first and second shock absorbers 52L and 54L can be mounted in any appropriate manner, such as but not limited to mechanical fasteners (with or without bushings) that can permit preferably provide at least two degrees of freedom of movement of the first and second shock absorbers 52L and 54L relative to each of the trailing arm 42L and the vehicle frame 12.

While the right and left rear suspensions 26R and 26L each includes two shock absorbers in the illustrated embodiment, it will be apparent from this disclosure that each of the right and left rear suspensions 26R and 26L includes at least one shock absorber.

With this arrangement of the left rear suspension 26L, the first control link 46L, the second control link 48L and the third control link 50L are connected to the floating rear knuckle 44L and connected to the vehicle frame 12 at points that maintain a zero toe and a zero camber through a full stroke of at least one of the first shock absorber 52L and the second shock absorber 54L. Also, in this arrangement, the left rear suspension 26L is configured to maintain a zero toe and a zero camber through a full stroke of at least one of the first and second shock absorbers 52L and 54L of the left rear suspension 26L. Namely, in this arrangement, the first ends 84 and 92 of the first and third control links 46L and 50L are connected to the floating rear knuckle 44L, while the first end 88 of the second control link 48L is connected to the trailing arm 42L. Also in this modification, the second ends 86, 90 and 94 of the first, second and third control links 46L, 48L and 50L are connected to the vehicle frame at points (the control link mounts 81, 82 and 83) to maintain a zero toe and a zero camber through a full stroke of at least one of the first and second shock absorbers 52L and 54L of the left rear suspension 26L.

Likewise, the right rear suspension 26R is configured to maintain a zero toe and a zero camber through a full stroke of at least one of the first and second shock absorbers 52R and 54R in the same manner as the left rear suspension 26L. Namely, in this arrangement, the first or rear ends of the first and third control links 46R and 50R are connected to the floating rear knuckle 44R, while the first or rear end of the second control link 48R is connected to the trailing arm 42R. Also in this modification, the second ends of the first, second and third control links 46R, 48R and 50R are connected to the vehicle frame at points to maintain a zero toe and a zero camber through a full stroke of at least one of the first and second shock absorbers 52R and 54R of the left rear suspension 26L.

Also in this modification, the second ends of the first, second and third control links are connected to the vehicle frame at points to maintain a zero toe and a zero camber through a full stroke of at least one of the first and second shock absorbers 52R and 54R of the right rear suspension 26R.

The vehicle 10 further comprises many other conventional vehicle components, such as an accelerator pedal, a brake system, a radiator, a radiator fan, a fuel tank, an electrical system, an exhaust system, various lights, various displays, gauges, etc. that are typically provided on recreational off-highway vehicles. However, for the sake of brevity, only those vehicle components needed to understand the present invention will be illustrated and/or discussed herein.

Figure 21:
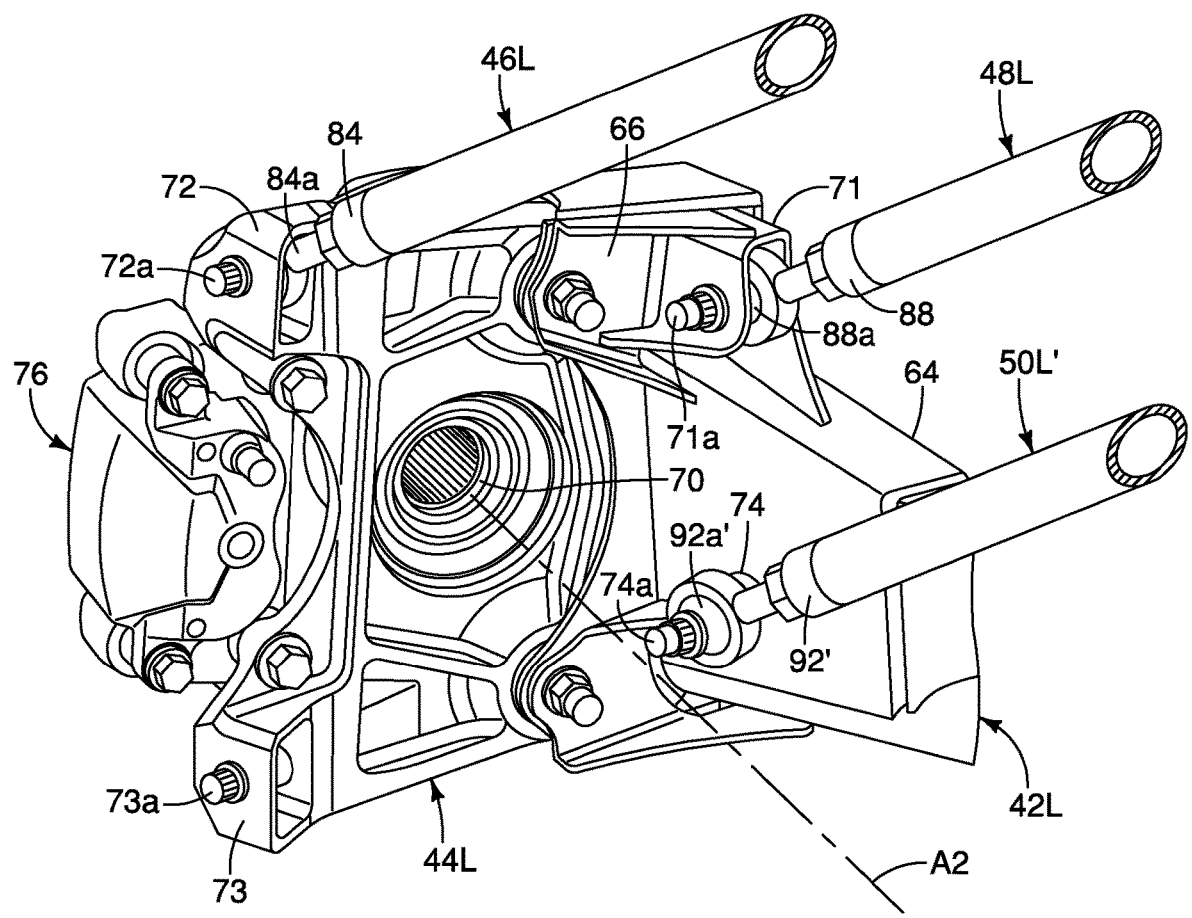
FIG. 21 is partial perspective view of a portion of the modified left rear suspension illustrated in FIG. 20.
Figure 22:
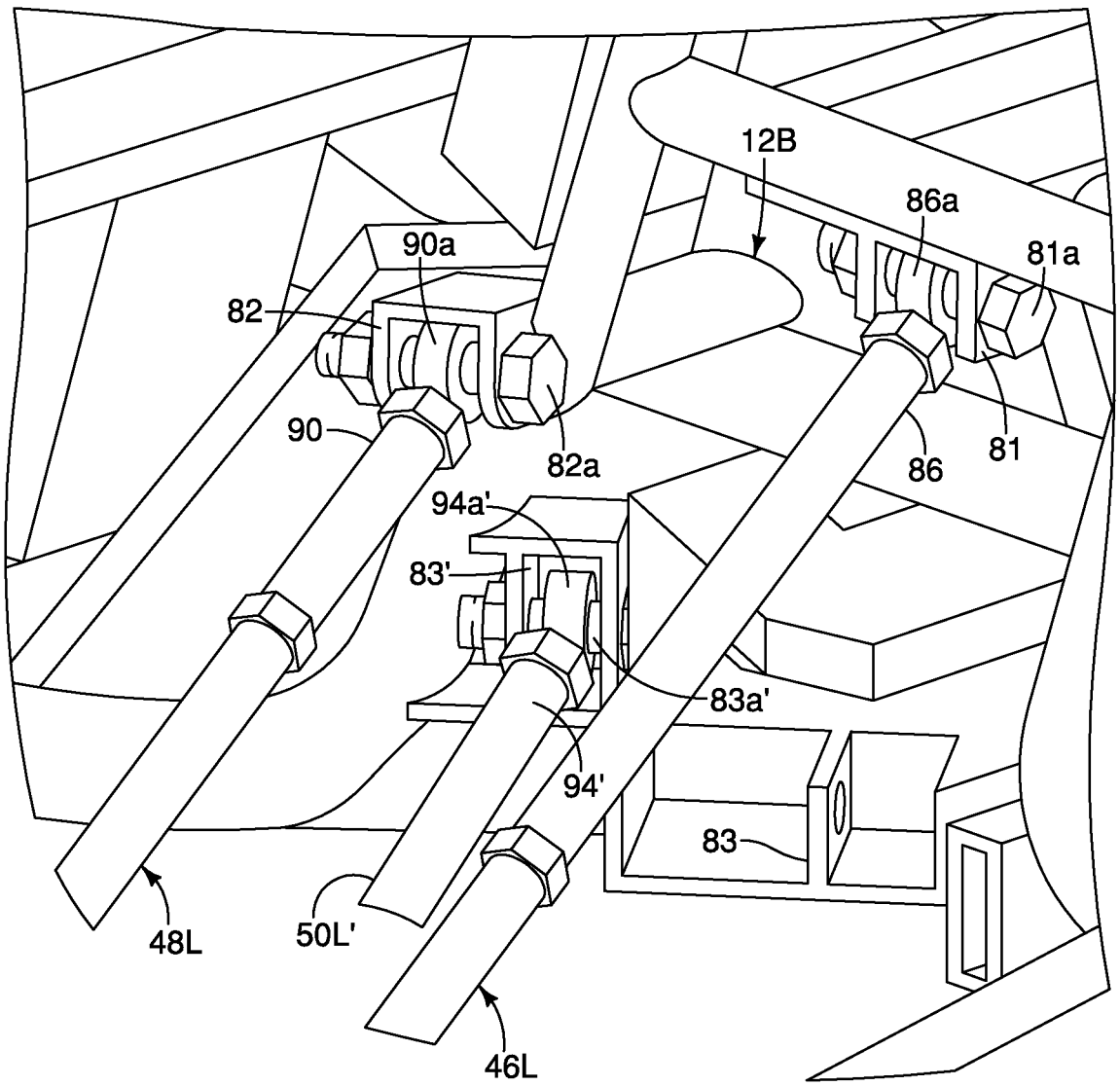
FIG. 22 is a further enlarged partial perspective view of the frame attachment portions illustrated in FIG. 20.

Referring now to FIGS. 20 to 22, the left rear suspension 26L had been modified. Namely, in this modification, a modified third control link 50L' is used in conjunction with the first control link 46L and the second control link 48L. Thus, as in the case of the first configuration, the first end of the first control link 46L is connected to floating rear knuckle 44L, and the first end of the second control link 48L is connected to the trailing arm 42L. However, in this modification, the modified third control link 50L' has a first end 92' that is mounted to the trailing arm 42L instead of to the floating rear knuckle 44L, and a second end 94' that is mounted to an alternative control link mount 83' instead of to the control link mount 83. The modified third control link 50L' has a different length than the third control link 50L to accommodate the different mount locations.

In this modification, same as the first configuration, the first end 84 of the first control link 46L is connected to the floating rear knuckle 44L rearward of the left drive shaft 40 that connects the rear differential 34 to the left rear wheel 16L. Also, in this modification, same as the first configuration, the first end 88 of the second control link 48L is connected to the trailing arm 42L forward of the left drive shaft 40 that connects the rear differential 34 to the left rear wheel 16L. In this modification, unlike the first configuration, the first end 92' of the modified third control link 50L' is connected to the trailing arm 42L forward of the left drive shaft 40 that connects the rear differential 34 to the left rear wheel 16L.

In this modification, same as the first configuration, the second end of the first control link 46L is connected to the vehicle frame 12 forward of the rear differential 34. Likewise, in this modification, same as the first configuration, the second end of the second control link 48L is connected to the vehicle frame 12 forward of the rear differential 34. Likewise, in this modification, same as the first configuration, the second end 94' of the modified third control link 50L' is connected to the vehicle frame 12 forward of the rear differential 34.

When the left rear suspension 26L had been modified as shown in FIGS. 20 to 22, the right rear suspension 26R is also preferably modified to be the mirror image of the left rear suspension 26L shown in FIGS. 20 and 21. Thus, the description of the left rear suspension 26L applies to the right rear suspension 26R. However, for the sake of brevity, this modification of the right rear suspension 26R will not be discussed and or illustrated in detail herein.

In this modification, the left rear suspension 26L is configured to maintain a zero toe and a zero camber through a full stroke of at least one of the first and second shock absorbers 52L and 54L of the left rear suspension 26L. Namely, in this modification, the first end of the first control link 46L is connected to the floating rear knuckle 44R, while the first ends of the second and third control links 48L and 50L are connected to the trailing arm 42L. Also in this modification, the second ends of the first, second and third control links are connected to the vehicle frame at points (the control link mounts 81, 82 and 83') to maintain a zero toe and a zero camber through a full stroke of at least one of the first and second shock absorbers 52L and 54L of the left rear suspension 26L.

Likewise, in this modification, the right rear suspension 26R is configured to maintain a zero toe and a zero camber through a full stroke of at least one of the first and second shock absorbers 52R and 54R in the same manner as the left rear suspension 26L. Namely, in this modification, the first end of the first control link 46R are connected to the floating rear knuckle 44R, while the first ends of the second and third control links 48R and 50R are connected to the trailing arm 42R. Also in this modification, the second ends of the first, second and third control links are connected to the vehicle frame at points to maintain a zero toe and a zero camber through a full stroke of at least one of the first and second shock absorbers 52R and 54R of the right rear suspension 26R.

Figure 23:
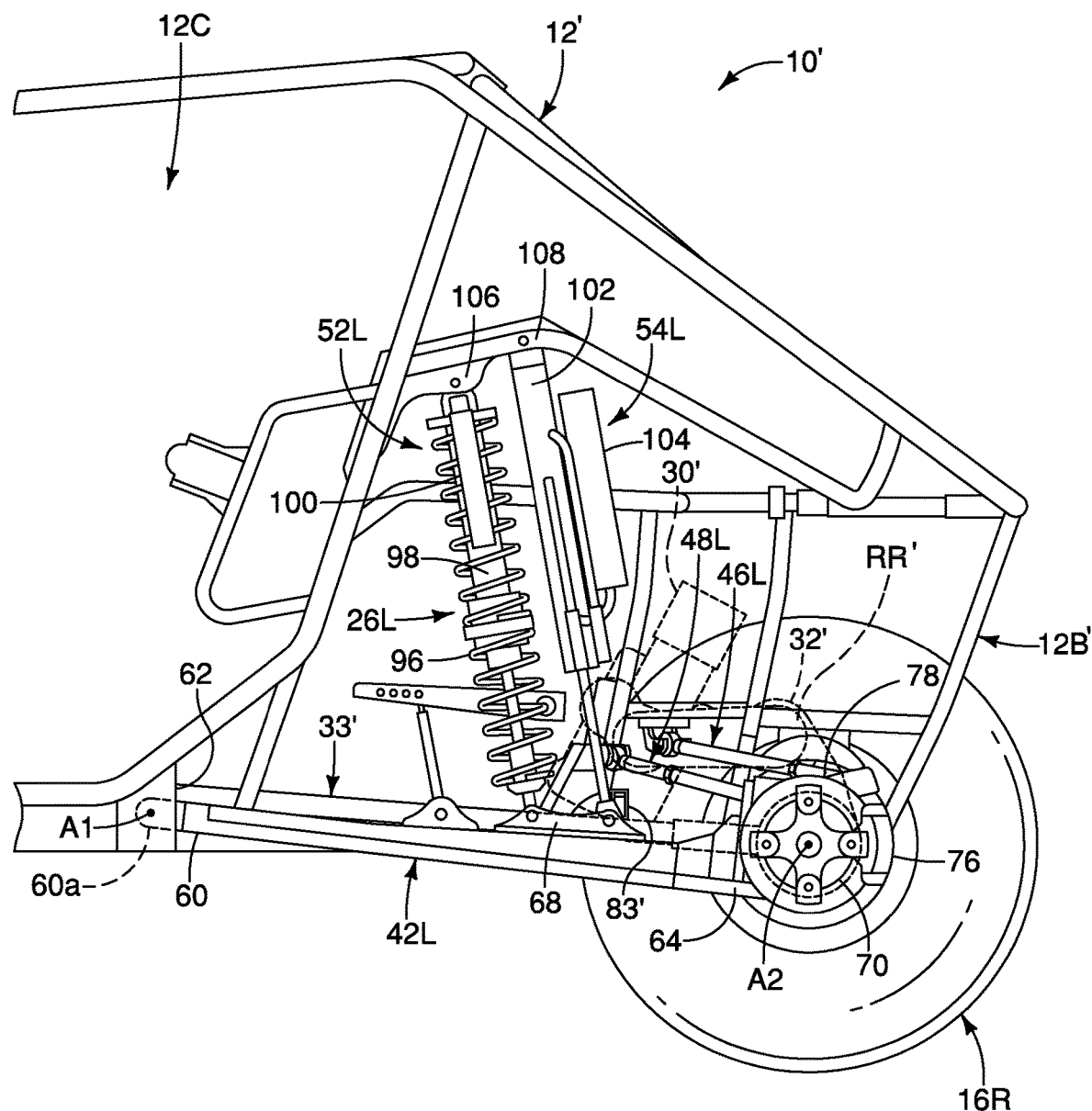
FIG. 23 is a left side elevational view of selected parts of a rear portion of a modified recreational off-highway vehicle corresponding to the resting position (1 g of force)
Figure 24:
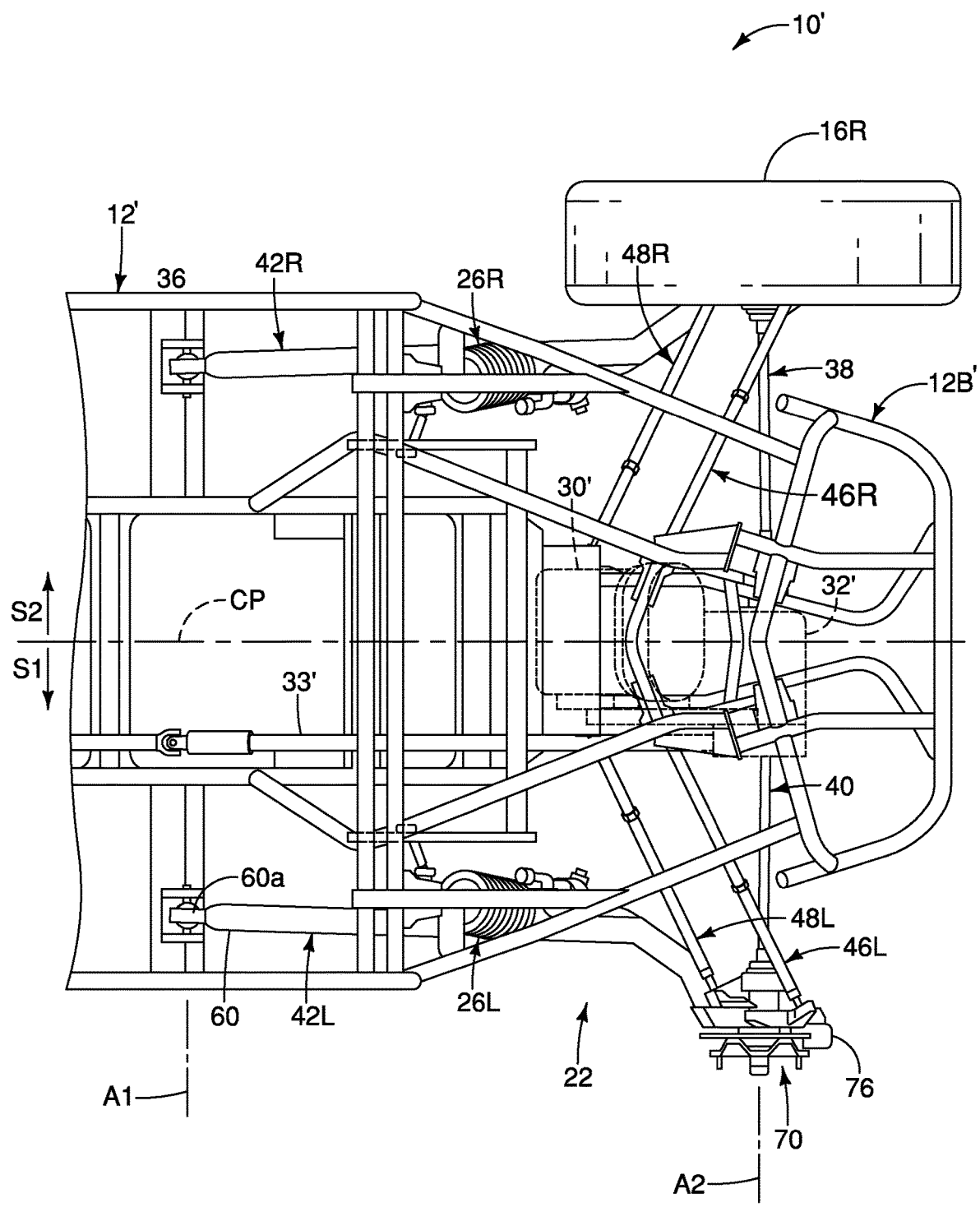
FIG. 24 is a top plan view of selected parts of the modified recreational off-highway vehicle illustrated in FIG. 23 corresponding to the resting position (1 g of force).

Turning now to FIGS. 23 and 24, a portion of a modified recreational off-highway vehicle 10' is illustrated. The modified recreational off-highway vehicle 10' uses the rear suspension 22 of the vehicle 10. Thus, the rear suspension 22 of the modified recreational off-highway vehicle 10' can have the control links set up as shown in FIGS. 15 to 19 or as in as shown in FIGS. 20 to 22.

Here, the modified recreational off-highway vehicle 10' has a modified vehicle frame 12 in which a rear portion 12B' has been configured to support an integrated engine-transmission unit such that the rear differential and the rear propeller shaft have been eliminated. Thus, the integrated engine-transmission unit has a motor 30' and a transmission 32' that are connected together as a unit. The motor 30' is an internal combustion engine but could be an electric motor. In the illustrated embodiment, the transmission 32' is bolted to the motor 30' so that the motor 30' and the transmission 32' can be installed and/or removed as a unit with respect to the vehicle frame 12'. Alternatively, the motor 30' and the transmission 32' can be separately mounted to the rear portion 12B' of the vehicle frame 12. In the illustrated embodiment, the transmission 32' is located rearward of the motor 30'. Here, a belt drive connects the motor 30' and the transmission 32' to transmit torque from the motor 30' to the transmission 32'. A propeller shaft 33' connects the transmission 32' to the front wheels 18 for driving the front wheels 18.

Here, the transmission 32' has a ring gear RR' that rotates about a lateral axis parallel to the transverse driveshaft axis A2. The ring gear RR' is operatively connected to the right rear wheel 16R by the right drive shaft 38 and to the left rear wheel 16L by the left drive shaft 40. Thus, the transmission 32' transmits torque to the right rear wheel 16R via the right drive shaft 38 and to the left rear wheel 16L via the left drive shaft 40. In this way, in the illustrated embodiment, the motor 30' is configured to drive the right and left rear wheels 16R and 16L via the transmission 32'. While the ring gear RR' is illustrated as being integral with the transmission 32', the driveline is not limited to this configuration. For example, a drive shaft can be provided between the transmission 32' and the ring gear RR'.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Thus, as used herein, the singular forms "a," "an" and "the" are intended to include the plural forms as well, unless the context clearly indicates otherwise. Also, the terms "part," "section," "portion," "member" or "element" when used in the singular can have the dual meaning of a single part or a plurality of parts. Unless otherwise defined, all terms (including technical and scientific terms) used herein have the same meaning as commonly understood by one of ordinary skill in the art to which illustrative embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Additionally, similar words used to describe the relationship between elements or layers should be interpreted in a like fashion (e.g., "between" versus "directly between", "above" versus "directly above", "below" versus "directly below", "adjacent" versus "directly adjacent," "on" versus "directly on"). Thus, components that are shown directly connected or contacting each other can have intermediate structures disposed between them unless specified otherwise.

It will be understood that, although the terms "first", "second", etc. may be used herein to describe various elements, components, regions, positions and/or sections, these elements, components, regions, positions and/or sections should not be limited by these terms. These terms are only used to distinguish one element, component, region, layer, position or section from another element, component, region, layer, position or section. Thus, a first element, component, region, position or section discussed above could be termed a second element, component, region, position or section without departing from the teachings of illustrative embodiments.

Spatially relative terms, such as "forward", "rearward", "above", "below", "beneath", "downward", "vertical", "horizontal", and "transverse" as well as any other similar spatial terms may be used herein for the ease of description to describe one element or feature's relationship to another element(s) or feature(s) of the above embodiments. These terms, as utilized to describe the present invention should be interpreted relative to a recreational off-highway vehicle on a flat horizontal surface and with to a direction in which a driver looks straight when seated on a driver's seat in a straightforward driving direction. The terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A recreational off-highway vehicle comprising:
   a vehicle frame having a front portion, a rear portion and a passenger compartment between the front and rear portions;
   at least one front wheel supporting the front portion of the vehicle frame;
   a right rear wheel supporting a right lateral side of the rear portion of the vehicle frame;
   a left rear wheel supporting a left lateral side of the rear portion of the vehicle frame;
   a right rear suspension operatively connecting the right rear wheel to the vehicle frame;
   a left rear suspension operatively connecting the left rear wheel to the vehicle frame;
   a rear differential operatively connected to the left rear wheel and the right rear wheel; and
   a motor operatively connected to the rear differential to drive the right and left rear wheels via the rear differential,
   each of the right and left rear suspensions comprising:
      a trailing arm having a front end pivotally connected to the vehicle frame,
      a floating rear knuckle pivotally connected to a rear end of the trailing arm,
      at least one shock absorber coupled between the vehicle frame and the trailing arm, and
      a plurality of control links having first ends movably supporting the floating rear knuckle and second ends pivotally connected to the vehicle frame forward of the rear differential.

2. The recreational off-highway vehicle according to claim 1, wherein
at least one of the control links of each of the right and left rear suspensions has a corresponding one of the first ends connected to the trailing arm forward of a drive shaft connecting the rear differential to a corresponding one of the right and left rear wheels.

3. The recreational off-highway vehicle according to claim 2, wherein
at least one of the control links of each of the right and left rear suspensions has a corresponding one of the first ends connected to the floating rear knuckle rearward of the drive shaft.

4. The recreational off-highway vehicle according to claim 1, wherein
at least one of the control links of each of the right and left rear suspensions has a corresponding one of the first ends connected to the floating rear knuckle rearward of a drive shaft connecting the rear differential to a corresponding one of the right and left rear wheels.

5. The recreational off-highway vehicle according to claim 1, wherein
the control links include a first control link having a corresponding one of the first ends connected to the floating rear knuckle, a second control link having a corresponding one of the first ends connected to the trailing arm, and a third control link having a corresponding one of the first ends connected to the floating rear knuckle.

6. The recreational off-highway vehicle according to claim 5, wherein
the first and third control links of each of the right and left rear suspensions have a corresponding one of the first ends connected to the floating rear knuckle rearward of a drive shaft connecting the rear differential to a corresponding one of the right and left rear wheels, and the second control link of each of the right and left rear suspensions has a corresponding one of the first ends connected to the trailing arm forward of the drive shaft.

7. The recreational off-highway vehicle according to claim 1, wherein
the control links include a first control link having a corresponding one of the first ends connected to the floating rear knuckle, a second control link having a corresponding one of the first ends connected to the trailing arm, and a third control link having a corresponding one of the first ends connected to the trailing arm.

8. The recreational off-highway vehicle according to claim 7, wherein
the second and third control links of each of the right and left rear suspensions have a corresponding one of the first ends connected to the trailing arm forward of a drive shaft connecting the rear differential to a corresponding one of the right and left rear wheels, and the first control link of each of the right and left rear suspensions has a corresponding one of the first ends connected to the floating rear knuckle rearward of the drive shaft.

9. The recreational off-highway vehicle according to claim 8, wherein
the first end of the first control link of each of the right and left rear suspensions is connected to the floating rear knuckle above the drive shaft.

10. The recreational off-highway vehicle according to claim 1, wherein
one of the control links of each of the right and left rear suspensions is arranged to cross a drive shaft connecting the rear differential to a corresponding one of the right and left rear wheels as viewed in a top plan view.

11. The recreational off-highway vehicle according to claim 10, wherein
the one of the control links of each of the right and left rear suspensions is arranged to cross above the drive shaft.

12. The recreational off-highway vehicle according to claim 10, wherein
the one of the control links of each of the right and left rear suspensions is arranged to cross below the drive shaft.

13. The recreational off-highway vehicle according to claim 1, wherein
the at least one shock absorber of each of the right and left rear suspensions includes a first shock absorber and a second shock absorber that has different damping characteristic from the first shock absorber.

14. The recreational off-highway vehicle according to claim 1, further comprising
a brake disc caliper mounted on the floating rear knuckle of each of the right and left rear suspensions.

15. The recreational off-highway vehicle according to claim 1, wherein
the first ends of the control links are connected to one of the floating rear knuckle and the trailing arm and the second ends of the control links are connected to the vehicle frame at points that maintain a zero toe and a zero camber through a full stroke of the at least one shock absorber of each of the right and left rear suspensions.

16. The recreational off-highway vehicle according to claim 15, wherein
the full stroke of the at least one shock absorber of each of the right and left rear suspensions provides more than 620 millimeters of travel for the right and left rear wheels.

17. The recreational off-highway vehicle according to claim 1, further comprising
a transmission located forward of the motor, which is between the transmission and the rear differential.

18. The recreational off-highway vehicle according to claim 17, wherein
the second ends of the control links of each of the right and left rear suspensions are located between the motor and the rear differential as viewed in a side elevational view.

19. The recreational off-highway vehicle according to claim 1, further comprising
a transmission located rearward of the motor.

20. A recreational off-highway vehicle comprising:
a vehicle frame having a front portion, a rear portion and a passenger compartment between the front and rear portions;
at least one front wheel supporting the front portion of the vehicle frame;
a right rear wheel supporting a right lateral side of the rear portion of the vehicle frame;
a left rear wheel supporting a left lateral side of the rear portion of the vehicle frame;
a right rear suspension operatively connecting the right rear wheel to the vehicle frame;
a left rear suspension operatively connecting the left rear wheel to the vehicle frame;

a right drive shaft having an outbound end connected to the right rear wheel;
a left drive shaft having an outbound end connected to the left rear wheel; and
a motor operatively connected to the right and left drive shafts to drive the right and left rear wheels, respectively,
each of the right and left rear suspensions comprising:
a trailing arm having a front end pivotally connected to the vehicle frame,
a floating rear knuckle pivotally connected to a rear end of the trailing arm,
at least one shock absorber coupled between the vehicle frame and the trailing arm, and
a plurality of control links having first ends movably supporting the floating rear knuckle and second ends pivotally connected to the vehicle frame forward of the right and left drive shafts.

\* \* \* \* \*